(12) United States Patent
Mora et al.

(10) Patent No.: US 11,506,044 B2
(45) Date of Patent: Nov. 22, 2022

(54) AUTOMATIC ANALYSIS OF DRILL STRING DYNAMICS

(71) Applicant: Saudi Arabian Oil Company, Dhahran (SA)

(72) Inventors: Arturo Magana Mora, Dhahran (SA); Michael Affleck, Aberdeenshire (GB); Chinthaka Pasan Gooneratne, Dhahran (SA); William Contreras Otalvora, Dhahran (SA); Krzysztof Karol Machocki, Aberdeen (GB)

(73) Assignee: Saudi Arabian Oil Company, Dhahran (SA)

( * ) Notice: Subject to any disclaimer, the term of this patent is extended or adjusted under 35 U.S.C. 154(b) by 211 days.

(21) Appl. No.: 16/936,878

(22) Filed: Jul. 23, 2020

(65) Prior Publication Data
US 2022/0025758 A1  Jan. 27, 2022

(51) Int. Cl.
*E21B 47/002* (2012.01)
*G06N 20/00* (2019.01)
(Continued)

(52) U.S. Cl.
CPC ............ *E21B 47/002* (2020.05); *E21B 44/08* (2013.01); *G06N 20/00* (2019.01); *G06T 7/0004* (2013.01); *G06T 2207/20081* (2013.01)

(58) Field of Classification Search
CPC ....... G06N 20/00; E21B 44/00; E21B 47/002; E21B 44/08; G06T 7/0004; G06T 2207/20081; G06T 7/00
See application file for complete search history.

(56) References Cited

U.S. PATENT DOCUMENTS

| 891,957 A | 6/1908 | Schubert |
| 2,043,225 A | 6/1936 | Armentrout et al. |

(Continued)

FOREIGN PATENT DOCUMENTS

| CA | 1226325 | 9/1987 |
| CA | 2249432 | 9/2005 |

(Continued)

OTHER PUBLICATIONS

"Hole Cleaning," Petrowiki, retrieved on Jan. 25, 2019, 8 pages.
(Continued)

*Primary Examiner* — Tuan H Nguyen
(74) *Attorney, Agent, or Firm* — Fish & Richardson P.C.

(57) ABSTRACT

Disclosed are methods, systems, and computer-readable medium to perform operations including: capturing, using an image sensor directed at a drilling system, an image feed of movement of a component of the drilling system with respect to a vertical reference line; converting the image feed into a digital representation of the movement of the component, the digital representation including a number of offset pixels from the component to the vertical reference line in the image feed; converting the digital representation into a machine learning (ML), the ML representation including a plurality of vectors each including the number of offset pixels from the component to the vertical reference line at a respective time; training a ML model using the ML representation to characterize the movement of the component as normal or abnormal; and using the trained ML model to characterize the movement of the component in real-time as normal or abnormal.

17 Claims, 10 Drawing Sheets

(51) Int. Cl.
   *E21B 44/08*  (2006.01)
   *G06T 7/00*   (2017.01)

(56) References Cited

U.S. PATENT DOCUMENTS

| | | |
|---|---|---|
| 2,110,913 A | 3/1938 | Lowrey |
| 2,227,729 A | 1/1941 | Lynes |
| 2,286,673 A | 6/1942 | Douglas |
| 2,305,062 A | 12/1942 | Church et al. |
| 2,344,120 A | 3/1944 | Baker |
| 2,757,738 A | 9/1948 | Ritchey |
| 2,509,608 A | 5/1950 | Penfield |
| 2,688,369 A | 9/1954 | Broyles |
| 2,690,897 A | 10/1954 | Clark |
| 2,719,363 A | 10/1955 | Richard et al. |
| 2,795,279 A | 6/1957 | Erich |
| 2,799,641 A | 7/1957 | Gordon |
| 2,805,045 A | 9/1957 | Goodwin |
| 2,822,150 A | 2/1958 | Muse et al. |
| 2,841,226 A | 7/1958 | Comad et al. |
| 2,899,000 A | 8/1959 | Medders et al. |
| 2,927,775 A | 3/1960 | Hildebrandt |
| 3,016,244 A | 1/1962 | Friedrich et al. |
| 3,028,915 A | 4/1962 | Jennings |
| 3,087,552 A | 4/1963 | Graham |
| 3,102,599 A | 9/1963 | Hillbum |
| 3,103,975 A | 9/1963 | Hanson |
| 3,104,711 A | 9/1963 | Haagensen |
| 3,114,875 A | 12/1963 | Haagensen |
| 3,133,592 A | 5/1964 | Tomberlin |
| 3,137,347 A | 6/1964 | Parker |
| 3,149,672 A | 9/1964 | Joseph et al. |
| 3,169,577 A | 2/1965 | Erich |
| 3,170,519 A | 2/1965 | Haagensen |
| 3,211,220 A | 10/1965 | Erich |
| 3,220,478 A | 11/1965 | Kinzbach |
| 3,236,307 A | 2/1966 | Brown |
| 3,253,336 A | 5/1966 | Brown |
| 3,268,003 A | 8/1966 | Essary |
| 3,331,439 A | 7/1967 | Lawrence |
| 3,428,125 A | 2/1969 | Parker |
| 3,468,373 A | 9/1969 | Smith |
| 3,522,848 A | 8/1970 | New |
| 3,547,192 A | 12/1970 | Claridge et al. |
| 3,547,193 A | 12/1970 | Gill |
| 3,642,066 A | 2/1972 | Gill |
| 3,656,564 A | 4/1972 | Brown |
| 3,696,866 A | 10/1972 | Dryden |
| 3,839,791 A | 10/1974 | Feamster |
| 3,862,662 A | 1/1975 | Kern |
| 3,874,450 A | 4/1975 | Kern |
| 3,931,856 A | 1/1976 | Barnes |
| 3,946,809 A | 3/1976 | Hagedorn |
| 3,948,319 A | 4/1976 | Pritchett |
| 4,008,762 A | 2/1977 | Fisher et al. |
| 4,010,799 A | 3/1977 | Kern et al. |
| 4,064,211 A | 12/1977 | Wood |
| 4,084,637 A | 4/1978 | Todd |
| 4,135,579 A | 1/1979 | Rowland et al. |
| 4,140,179 A | 2/1979 | Kasevich et al. |
| 4,140,180 A | 2/1979 | Bridges et al. |
| 4,144,935 A | 3/1979 | Bridges et al. |
| 4,191,493 A | 3/1980 | Hansson et al. |
| 4,193,448 A | 3/1980 | Jearnbey |
| 4,193,451 A | 3/1980 | Dauphine |
| 4,196,329 A | 4/1980 | Rowland et al. |
| 4,199,025 A | 4/1980 | Carpenter |
| 4,265,307 A | 5/1981 | Elkins |
| RE30,738 E | 9/1981 | Bridges et al. |
| 4,301,865 A | 11/1981 | Kasevich et al. |
| 4,320,801 A | 3/1982 | Rowland et al. |
| 4,334,928 A | 6/1982 | Hara |
| 4,337,653 A | 7/1982 | Chauffe |
| 4,343,651 A | 8/1982 | Yazu et al. |
| 4,354,559 A | 10/1982 | Johnson |
| 4,373,581 A | 2/1983 | Toellner |
| 4,394,170 A | 7/1983 | Sawaoka et al. |
| 4,396,062 A | 8/1983 | Iskander |
| 4,412,585 A | 11/1983 | Bouck |
| 4,413,642 A | 11/1983 | Smith et al. |
| 4,449,585 A | 5/1984 | Bridges et al. |
| 4,457,365 A | 7/1984 | Kasevich et al. |
| 4,470,459 A | 9/1984 | Copland |
| 4,476,926 A | 10/1984 | Bridges et al. |
| 4,484,627 A | 11/1984 | Perkins |
| 4,485,868 A | 12/1984 | Sresty et al. |
| 4,485,869 A | 12/1984 | Sresty et al. |
| 4,487,257 A | 12/1984 | Dauphine |
| 4,495,990 A | 1/1985 | Titus et al. |
| 4,498,535 A | 2/1985 | Bridges |
| 4,499,948 A | 2/1985 | Perkins |
| 4,508,168 A | 4/1985 | Heeren |
| 4,513,815 A | 4/1985 | Rundell et al. |
| 4,524,826 A | 6/1985 | Savage |
| 4,524,827 A | 6/1985 | Bridges et al. |
| 4,545,435 A | 10/1985 | Bridges et al. |
| 4,553,592 A | 11/1985 | Looney et al. |
| 4,557,327 A | 12/1985 | Kinley et al. |
| 4,576,231 A | 3/1986 | Dowling et al. |
| 4,583,589 A | 4/1986 | Kasevich |
| 4,592,423 A | 6/1986 | Savage et al. |
| 4,612,988 A | 9/1986 | Segalman |
| 4,620,593 A | 11/1986 | Haagensen |
| 4,636,934 A | 1/1987 | Schwendemann |
| RE32,345 E | 3/1987 | Wood |
| 4,660,636 A | 4/1987 | Rundell et al. |
| 4,705,108 A | 11/1987 | Little et al. |
| 4,817,711 A | 4/1989 | Jearnbey |
| 5,012,863 A | 5/1991 | Springer |
| 5,018,580 A | 5/1991 | Skipper |
| 5,037,704 A | 8/1991 | Nakai et al. |
| 5,055,180 A | 10/1991 | Klaila |
| 5,068,819 A | 11/1991 | Misra et al. |
| 5,070,952 A | 12/1991 | Neff |
| 5,074,355 A | 12/1991 | Lennon |
| 5,082,054 A | 1/1992 | Kiamanesh |
| 5,092,056 A | 3/1992 | Deaton |
| 5,107,705 A | 4/1992 | Wraight et al. |
| 5,107,931 A | 4/1992 | Valka et al. |
| 5,228,518 A | 7/1993 | Wilson et al. |
| 5,236,039 A | 8/1993 | Edelstein et al. |
| 5,278,550 A | 1/1994 | Rhein-Knudsen et al. |
| 5,388,648 A | 2/1995 | Jordan, Jr. |
| 5,490,598 A | 2/1996 | Adams |
| 5,501,248 A | 3/1996 | Kiest, Jr. |
| 5,690,826 A | 11/1997 | Cravello |
| 5,803,186 A | 9/1998 | Berger et al. |
| 5,803,666 A | 9/1998 | Keller |
| 5,813,480 A | 9/1998 | Zaleski, Jr. et al. |
| 5,853,049 A | 12/1998 | Keller |
| 5,890,540 A | 4/1999 | Pia et al. |
| 5,899,274 A | 5/1999 | Frauenfeld et al. |
| 5,947,213 A | 9/1999 | Angle |
| 5,955,666 A | 9/1999 | Mullins |
| 5,958,236 A | 9/1999 | Bakula |
| RE36,362 E | 11/1999 | Jackson |
| 6,012,526 A | 1/2000 | Jennings et al. |
| 6,032,742 A | 3/2000 | Tomlin et al. |
| 6,041,860 A | 3/2000 | Nazzal et al. |
| 6,047,239 A | 4/2000 | Berger et al. |
| 6,096,436 A | 8/2000 | Inspektor |
| 6,170,531 B1 | 1/2001 | Jung et al. |
| 6,173,795 B1 | 1/2001 | McGarian et al. |
| 6,189,611 B1 | 2/2001 | Kasevich |
| 6,254,844 B1 | 7/2001 | Takeuchi et al. |
| 6,268,726 B1 | 7/2001 | Prammer |
| 6,269,953 B1 | 8/2001 | Seyffert et al. |
| 6,290,068 B1 | 9/2001 | Adams et al. |
| 6,305,471 B1 | 10/2001 | Milloy |
| 6,325,216 B1 | 12/2001 | Seyffert et al. |
| 6,328,111 B1 | 12/2001 | Bearden et al. |
| 6,330,913 B1 | 12/2001 | Langseth et al. |
| 6,354,371 B1 | 3/2002 | O'Blanc |
| 6,371,302 B1 | 4/2002 | Adams et al. |

(56) References Cited

U.S. PATENT DOCUMENTS

| | | |
|---|---|---|
| 6,413,399 B1 | 7/2002 | Kasevich |
| 6,443,228 B1 | 9/2002 | Aronstam |
| 6,454,099 B1 | 9/2002 | Adams et al. |
| 6,510,947 B1 | 1/2003 | Schulte et al. |
| 6,534,980 B2 | 2/2003 | Toufaily et al. |
| 6,544,411 B2 | 4/2003 | Varandaraj |
| 6,561,269 B1 | 5/2003 | Brown et al. |
| 6,571,877 B1 | 6/2003 | Van Bilderbeek |
| 6,607,080 B2 | 8/2003 | Winkler et al. |
| 6,612,384 B1 | 9/2003 | Singh et al. |
| 6,622,554 B2 | 9/2003 | Manke et al. |
| 6,623,850 B2 | 9/2003 | Kukino et al. |
| 6,629,610 B1 | 10/2003 | Adams et al. |
| 6,637,092 B1 | 10/2003 | Menzel |
| 6,678,616 B1 | 1/2004 | Winkler et al. |
| 6,722,504 B2 | 4/2004 | Schulte et al. |
| 6,741,000 B2 | 5/2004 | Newcomb |
| 6,761,230 B2 | 7/2004 | Cross et al. |
| 6,814,141 B2 | 11/2004 | Huh et al. |
| 6,827,145 B2 | 12/2004 | Fotland et al. |
| 6,845,818 B2 | 1/2005 | Tutuncu et al. |
| 6,850,068 B2 | 2/2005 | Chernali et al. |
| 6,895,678 B2 | 5/2005 | Ash et al. |
| 6,912,177 B2 | 6/2005 | Smith |
| 6,971,265 B1 | 12/2005 | Sheppard et al. |
| 6,993,432 B2 | 1/2006 | Jenkins et al. |
| 7,000,777 B2 | 2/2006 | Adams et al. |
| 7,013,992 B2 | 3/2006 | Tessari et al. |
| 7,048,051 B2 | 5/2006 | McQueen |
| 7,063,155 B2 | 6/2006 | Ruttley |
| 7,086,463 B2 | 8/2006 | Ringgenberg et al. |
| 7,091,460 B2 | 8/2006 | Kinzer |
| 7,109,457 B2 | 9/2006 | Kinzer |
| 7,115,847 B2 | 10/2006 | Kinzer |
| 7,124,819 B2 | 10/2006 | Ciglenec et al. |
| 7,216,767 B2 | 5/2007 | Schulte et al. |
| 7,312,428 B2 | 12/2007 | Kinzer |
| 7,322,776 B2 | 1/2008 | Webb et al. |
| 7,331,385 B2 | 2/2008 | Symington |
| 7,376,514 B2 | 5/2008 | Habashy et al. |
| 7,387,174 B2 | 6/2008 | Lurie |
| 7,445,041 B2 | 11/2008 | O'Brien |
| 7,455,117 B1 | 11/2008 | Hall et al. |
| 7,461,693 B2 | 12/2008 | Considine et al. |
| 7,484,561 B2 | 2/2009 | Bridges |
| 7,539,548 B2 | 5/2009 | Dhawan |
| 7,562,708 B2 | 7/2009 | Cogliandro et al. |
| 7,629,497 B2 | 12/2009 | Pringle |
| 7,631,691 B2 | 12/2009 | Symington et al. |
| 7,647,980 B2 | 1/2010 | Corre et al. |
| 7,650,269 B2 | 1/2010 | Rodney |
| 7,677,673 B2 | 3/2010 | Tranquilla et al. |
| 7,730,625 B2 | 6/2010 | Blake |
| 7,779,903 B2 | 8/2010 | Bailey et al. |
| 7,951,482 B2 | 5/2011 | Ichinose et al. |
| 7,980,392 B2 | 7/2011 | Varco |
| 8,067,865 B2 | 11/2011 | Savant |
| 8,237,444 B2 | 8/2012 | Simon |
| 8,245,792 B2 | 8/2012 | Trinh et al. |
| 8,275,549 B2 | 9/2012 | Sabag et al. |
| 8,286,734 B2 | 10/2012 | Hannegan et al. |
| 8,484,858 B2 | 7/2013 | Brannigan et al. |
| 8,511,404 B2 | 8/2013 | Rasheed |
| 8,526,171 B2 | 9/2013 | Wu et al. |
| 8,528,668 B2 | 9/2013 | Rasheed |
| 8,567,491 B2 | 10/2013 | Lurie |
| 8,794,062 B2 | 8/2014 | DiFoggio et al. |
| 8,884,624 B2 | 11/2014 | Homan et al. |
| 8,925,213 B2 | 1/2015 | Sallwasser |
| 8,960,215 B2 | 2/2015 | Cui et al. |
| 8,973,680 B2 | 3/2015 | MacKenzie |
| 9,051,810 B1 | 6/2015 | Cuffe et al. |
| 9,109,429 B2 | 8/2015 | Xu et al. |
| 9,217,323 B2 | 12/2015 | Clark |
| 9,222,350 B2 | 12/2015 | Vaughn et al. |
| 9,238,953 B2 | 1/2016 | Fleming et al. |
| 9,238,961 B2 | 1/2016 | Bedouet |
| 9,250,339 B2 | 2/2016 | Ramirez |
| 9,353,589 B2 | 5/2016 | Hekelaar |
| 9,394,782 B2 | 7/2016 | DiGiovanni et al. |
| 9,435,159 B2 | 9/2016 | Scott |
| 9,464,487 B1 | 10/2016 | Zurn |
| 9,470,059 B2 | 10/2016 | Zhou |
| 9,494,010 B2 | 11/2016 | Flores |
| 9,494,032 B2 | 11/2016 | Roberson et al. |
| 9,528,366 B2 | 12/2016 | Selman et al. |
| 9,562,987 B2 | 2/2017 | Guner et al. |
| 9,617,815 B2 | 4/2017 | Scwartze et al. |
| 9,664,011 B2 | 5/2017 | Kruspe et al. |
| 9,702,211 B2 | 7/2017 | Tinnen |
| 9,731,471 B2 | 8/2017 | Schaedler et al. |
| 9,739,141 B2 | 8/2017 | Zeng et al. |
| 9,845,653 B2 | 12/2017 | Hannegan et al. |
| 10,000,983 B2 | 6/2018 | Jackson et al. |
| 10,174,577 B2 | 1/2019 | Leuchtenberg et al. |
| 10,233,372 B2 | 3/2019 | Ramasamy et al. |
| 10,329,877 B2 | 6/2019 | Simpson et al. |
| 10,392,910 B2 | 8/2019 | Walton et al. |
| 10,394,193 B2 | 8/2019 | Li et al. |
| 10,544,640 B2 | 1/2020 | Hekelaar et al. |
| 2002/0066563 A1 | 6/2002 | Langseth et al. |
| 2003/0159776 A1 | 8/2003 | Graham |
| 2003/0230526 A1 | 12/2003 | Okabayshi et al. |
| 2004/0182574 A1 | 9/2004 | Sarmad et al. |
| 2004/0256103 A1 | 12/2004 | Batarseh |
| 2005/0022987 A1 | 2/2005 | Green et al. |
| 2005/0092523 A1 | 5/2005 | McCaskill et al. |
| 2005/0259512 A1 | 11/2005 | Mandal |
| 2006/0016592 A1 | 1/2006 | Wu |
| 2006/0106541 A1 | 5/2006 | Hassan et al. |
| 2006/0144620 A1 | 7/2006 | Cooper |
| 2006/0185843 A1 | 8/2006 | Smith |
| 2006/0248949 A1 | 11/2006 | Gregory et al. |
| 2006/0249307 A1 | 11/2006 | Ritter |
| 2007/0131591 A1 | 6/2007 | Pringle |
| 2007/0137852 A1 | 6/2007 | Considine et al. |
| 2007/0175633 A1 | 8/2007 | Kosmala |
| 2007/0187089 A1 | 8/2007 | Bridges |
| 2007/0204994 A1 | 9/2007 | Wimmersperg |
| 2007/0289736 A1 | 12/2007 | Kearl et al. |
| 2008/0007421 A1 | 1/2008 | Liu et al. |
| 2008/0047337 A1 | 2/2008 | Chemali et al. |
| 2008/0053652 A1 | 3/2008 | Corre et al. |
| 2008/0173480 A1 | 7/2008 | Annaiyappa et al. |
| 2008/0190822 A1 | 8/2008 | Young |
| 2008/0308282 A1 | 12/2008 | Standridge et al. |
| 2009/0153354 A1 | 6/2009 | Daussin |
| 2009/0164125 A1 | 6/2009 | Bordakov et al. |
| 2009/0178809 A1 | 7/2009 | Jeffryes et al. |
| 2009/0259446 A1 | 10/2009 | Zhang et al. |
| 2010/0006339 A1 | 1/2010 | Desai |
| 2010/0089583 A1 | 4/2010 | Xu et al. |
| 2010/0276209 A1 | 11/2010 | Yong et al. |
| 2010/0282511 A1 | 11/2010 | Maranuk |
| 2011/0011576 A1 | 1/2011 | Cavender et al. |
| 2011/0120732 A1 | 5/2011 | Lurie |
| 2011/0155368 A1 | 6/2011 | El-Khazindar |
| 2012/0012319 A1 | 1/2012 | Dennis |
| 2012/0111578 A1 | 5/2012 | Tverlid |
| 2012/0132418 A1 | 5/2012 | McClung |
| 2012/0152543 A1 | 6/2012 | Davis |
| 2012/0173196 A1 | 7/2012 | Miszewski |
| 2012/0186817 A1 | 7/2012 | Gibson et al. |
| 2012/0222854 A1 | 9/2012 | McClung, III |
| 2012/0227983 A1 | 9/2012 | Lymberopoulous et al. |
| 2012/0273187 A1 | 11/2012 | Hall |
| 2013/0008653 A1 | 1/2013 | Schultz et al. |
| 2013/0008671 A1 | 1/2013 | Booth |
| 2013/0025943 A1 | 1/2013 | Kumar |
| 2013/0076525 A1 | 3/2013 | Vu et al. |
| 2013/0125642 A1 | 5/2013 | Parfitt |
| 2013/0126164 A1 | 5/2013 | Sweatman et al. |
| 2013/0146359 A1 | 6/2013 | Koederitz |
| 2013/0213637 A1 | 8/2013 | Kearl |

(56) References Cited

U.S. PATENT DOCUMENTS

| | | |
|---|---|---|
| 2013/0255936 A1 | 10/2013 | Statoilydro et al. |
| 2014/0083771 A1 | 3/2014 | Clark |
| 2014/0183143 A1 | 7/2014 | Cady et al. |
| 2014/0231075 A1 | 8/2014 | Springett et al. |
| 2014/0231147 A1 | 8/2014 | Bozso et al. |
| 2014/0238658 A1 | 8/2014 | Wilson et al. |
| 2014/0246235 A1 | 9/2014 | Yao |
| 2014/0251894 A1 | 9/2014 | Larson et al. |
| 2014/0265337 A1 | 9/2014 | Harding et al. |
| 2014/0278111 A1 | 9/2014 | Gerrie et al. |
| 2014/0291023 A1 | 10/2014 | Edbury |
| 2014/0300895 A1 | 10/2014 | Pope et al. |
| 2014/0333754 A1 | 11/2014 | Graves et al. |
| 2014/0360778 A1 | 12/2014 | Batarseh |
| 2014/0375468 A1 | 12/2014 | Wilkinson et al. |
| 2015/0020908 A1 | 1/2015 | Warren |
| 2015/0021240 A1 | 1/2015 | Wardell et al. |
| 2015/0027724 A1 | 1/2015 | Symms |
| 2015/0083422 A1 | 3/2015 | Pritchard |
| 2015/0091737 A1 | 4/2015 | Richardson et al. |
| 2015/0101864 A1 | 4/2015 | May |
| 2015/0159467 A1 | 6/2015 | Hartman et al. |
| 2015/0211362 A1 | 7/2015 | Rogers |
| 2015/0267500 A1 | 9/2015 | Van Dogen |
| 2015/0290878 A1 | 10/2015 | Houben et al. |
| 2015/0300151 A1 | 10/2015 | Mohaghegh |
| 2016/0053572 A1 | 2/2016 | Snoswell |
| 2016/0053604 A1 | 2/2016 | Abbassian |
| 2016/0076357 A1 | 3/2016 | Hbaieb |
| 2016/0115783 A1 | 4/2016 | Zeng et al. |
| 2016/0130928 A1 | 5/2016 | Torrione |
| 2016/0153240 A1 | 6/2016 | Braga et al. |
| 2016/0160106 A1 | 6/2016 | Jamison et al. |
| 2016/0237810 A1 | 8/2016 | Beaman et al. |
| 2016/0247316 A1 | 8/2016 | Whalley et al. |
| 2016/0356125 A1 | 12/2016 | Bello et al. |
| 2017/0051785 A1 | 2/2017 | Cooper |
| 2017/0161885 A1 | 6/2017 | Parmeshwar et al. |
| 2017/0234104 A1 | 8/2017 | James |
| 2017/0292376 A1 | 10/2017 | Kumar et al. |
| 2017/0314335 A1 | 11/2017 | Kosonde et al. |
| 2017/0328196 A1 | 11/2017 | Shi et al. |
| 2017/0328197 A1 | 11/2017 | Shi et al. |
| 2017/0342776 A1 | 11/2017 | Bullock et al. |
| 2017/0350201 A1 | 12/2017 | Shi et al. |
| 2017/0350241 A1 | 12/2017 | Shi |
| 2018/0010030 A1 | 1/2018 | Ramasamy et al. |
| 2018/0010419 A1 | 1/2018 | Livescu et al. |
| 2018/0171772 A1 | 6/2018 | Rodney |
| 2018/0187498 A1 | 7/2018 | Soto et al. |
| 2018/0265416 A1 | 9/2018 | Ishida et al. |
| 2018/0326679 A1 | 11/2018 | Weisenberg et al. |
| 2018/0334883 A1 | 11/2018 | Williamson |
| 2018/0363404 A1 | 12/2018 | Faugstad |
| 2019/0049054 A1 | 2/2019 | Gunnarsson et al. |
| 2019/0101872 A1 | 4/2019 | Li |
| 2019/0147125 A1* | 5/2019 | Yu .................. G06F 30/20 703/10 |
| 2019/0227499 A1 | 7/2019 | Li et al. |
| 2019/0257180 A1 | 8/2019 | Kriesels et al. |
| 2020/0032638 A1 | 1/2020 | Ezzeddine |
| 2020/0051206 A1* | 2/2020 | Munkberg .............. G06T 1/20 |
| 2020/0190963 A1 | 6/2020 | Gooneratne et al. |

FOREIGN PATENT DOCUMENTS

| | | |
|---|---|---|
| CA | 2537585 | 8/2006 |
| CA | 2669721 | 7/2011 |
| CA | 2594042 | 8/2012 |
| CN | 200989202 | 12/2007 |
| CN | 203232293 | 10/2013 |
| CN | 204627586 | 9/2015 |
| CN | 107462222 | 12/2017 |
| CN | 110571475 | 12/2019 |
| DE | 102008001607 | 11/2009 |
| DE | 102012022453 | 5/2014 |
| DE | 102013200450 | 7/2014 |
| DE | 102012205757 | 8/2014 |
| EP | 2317068 | 5/2011 |
| EP | 2574722 | 4/2013 |
| EP | 2737173 | 6/2014 |
| GB | 2124855 | 2/1984 |
| GB | 2357305 | 6/2001 |
| GB | 2399515 | 9/2004 |
| GB | 2422125 | 7/2006 |
| GB | 2532967 | 6/2016 |
| JP | 2009067609 | 4/2009 |
| JP | 4275896 | 6/2009 |
| JP | 5013156 | 8/2012 |
| JP | 2013110910 | 6/2013 |
| NO | 343139 | 11/2018 |
| NO | 20161842 | 5/2019 |
| RU | 2282708 | 8/2006 |
| RU | 122531 | 11/2012 |
| WO | WO 1995035429 | 12/1995 |
| WO | WO 1997021904 | 6/1997 |
| WO | WO 2000025942 | 5/2000 |
| WO | WO 2000031374 | 6/2000 |
| WO | WO 2001042622 | 6/2001 |
| WO | WO 2002020944 | 3/2002 |
| WO | WO 2002068793 | 9/2002 |
| WO | WO 2004042185 | 5/2004 |
| WO | WO 2007049026 | 5/2007 |
| WO | WO 2007070305 | 6/2007 |
| WO | WO 2008146017 | 12/2008 |
| WO | WO 2009020889 | 2/2009 |
| WO | WO 2009113895 | 9/2009 |
| WO | WO 2010105177 | 9/2010 |
| WO | WO 2011038170 | 3/2011 |
| WO | WO 2011042622 | 6/2011 |
| WO | WO 2012007407 | 1/2012 |
| WO | WO 2013016095 | 1/2013 |
| WO | WO 2013148510 | 10/2013 |
| WO | WO 2014127035 | 8/2014 |
| WO | WO 2015095155 | 6/2015 |
| WO | WO 2016178005 | 11/2016 |
| WO | WO 2017011078 | 1/2017 |
| WO | WO 2017132297 | 8/2017 |
| WO | WO 2017196303 | 11/2017 |
| WO | WO 2018022198 | 2/2018 |
| WO | WO 2018169991 | 9/2018 |
| WO | WO 2019040091 | 2/2019 |
| WO | WO 2019055240 | 3/2019 |
| WO | WO 2019089926 | 5/2019 |
| WO | WO 2019108931 | 6/2019 |
| WO | WO 2019169067 | 9/2019 |
| WO | WO 2019236288 | 12/2019 |
| WO | WO 2019246263 | 12/2019 |

OTHER PUBLICATIONS

"IADC Dull Grading for PDC Drill Bits," Beste Bit, SPE/IADC 23939, 1992, 52 pages.

Akersolutions, "Aker MH CCTC Improving Safety," Jan. 2008.

Anwar et al., "Fog computing: an overview of big IoT data analytics," Wireless communications and mobile computing, May 2018, 2018:1-22.

Artymiuk et al., "The new drilling control and monitoring system," Acta Montanistica Slovaca, Sep. 2004, 9(3):145-151.

Ashby et al., "Coiled Tubing Conveyed Video Camera and Multi-Arm Caliper Liner Damage Diagnostics Post Plug and Perf Frac," Society of Petroleum Engineers, SPE-172622-MS, Mar. 2015, pp. 12.

Bilal et al., "Potentials, trends, and prospects in edge technologies: Fog, cloudlet, mobile edge, and micro data centers," Computer Networks, Elsevier, Oct. 2017, 130:94-120.

Carpenter, "Advancing Deepwater Kick Detection," JPT, vol. 68, Issue 5, May 2016, 2 pages.

Commer et al., "New advances in three-dimensional controlled-source electromagnetic inversion," Geophys. J. Int., 2008, 172: 513-535.

(56) References Cited

OTHER PUBLICATIONS

Dickens et al., "An LED array-based light induced fluorescence sensor for real-time process and field monitoring," Sensors and Actuators B: Chemical, Elsevier, Apr. 2011, 158(1): 35-42.
Dong et al., "Dual Substitution and Spark Plasma Sintering to Improve Ionic Conductivity of Garnet Li7La3Zr2O12," Nanomaterials, 9, 721, 2019, 10 pages.
downholediagnostic.com [online], "Acoustic Fluid Level Surveys," retrieved from URL <https://www.downholediagnostic.com/fluid-level>, retrieved on Mar. 27, 2020, available on or before 2018, 13 pages.
edition.cnn.com [online], "Revolutionary gel is five times stronger than steel," retrieved from URL <https://edition.cnn.com/style/article/hydrogel-steel-japan/index.html>, retrieved on Apr. 2, 2020, available on or before Jul. 16, 2017, 6 pages.
Gemmeke and Ruiter, "3D ultrasound computer tomography for medical imagining," Nuclear Instruments and Methods in Physics Research A 580, Oct. 1, 2007, 9 pages.
Halliburton, "Drill Bits and Services Solutions Catalogs," retrieved from URL: <https://www.halliburton.com/content/dam/ps/public/sdbs/sdbs_contents/Books_and_Catalogs/web/DBS-Solution.pdf> on Sep. 26, 2019, Copyright 2014, 64 pages.
Hopkin, "Factor Affecting Cuttings Removal during Rotary Drilling," Journal of Petroleum Technology 19.06, Jun. 1967, 8 pages.
Ji et al., "Submicron Sized Nb Doped Lithium Garnet for High Ionic Conductivity Solid Electrolyte and Performance of All Solid-State Lithium Battery," doi:10.20944/preprints201912.0307.v1, Dec. 2019, 10 pages.
Johnson et al., "Advanced Deepwater Kick Detection," IADC/SPE 167990, presented at the 2014 IADC/SPE Drilling Conference and Exhibition, Mar. 4-6, 2014, 10 pages.
Johnson, "Design and Testing of a Laboratory Ultrasonic Data Acquisition System for Tomography" Thesis for the degree of Master of Science in Mining and Minerals Engineering, Virginia Polytechnic Institute and State University, Dec. 2, 2004, 108 pages.
King et al., "Atomic layer deposition of TiO2 films on particles in a fluidized bed reactor," Power Technology, vol. 183, Issue 3, Apr. 2008, 8 pages.
Li et al., 3D Printed Hybrid Electrodes for Lithium-ion Batteries, Missouri University of Science and Technology, Washington State University; ECS Transactions, 77 (11) 1209-1218 (2017), 11 pages.
Liu et al., "Flow visualization and measurement in flow field of a torque converter," Mechanic automation and control Engineering, Second International Conference on IEEE, Jul. 15, 2011, 1329-1331.
Liu et al., "Superstrong micro-grained poly crystalline diamond compact through work hardening under high pressure," Appl. Phys. Lett. Feb. 2018, 112: 6 pages.
Luo et al., "Simple Charts to Determine Hole Cleaning Requirements in Deviated Wells," IADC/SPE 27486, SPE/IADC Drilling Conference, Society of Petroleum Engineers, Feb. 15-18, 1994, 7 pages.
Maurer, "The Perfect Cleaning Theory of Rotary Drilling," Journal of Petroleum Technology 14.11, 1962, 5 pages.
nature.com [online], "Mechanical Behavior of a Soft Hydrogel Reinforced with Three-Dimensional Printed Microfibre Scaffolds," retrieved from URL <https://www.nature.com/articles/s41598-018-19502-y>, retrieved on Apr. 2, 2020, available on or before Jan. 19, 2018, 47 pages.
Nuth, "Smart oil field distributed computing," The Industrial Ethernet Book, Nov. 2014, 85(14): 1-3.
Olver, "Compact Antenna Test Ranges," Seventh International Conference on Antennas and Propagation IEEE, Apr. 15-18, 1991, 10 pages.
Paiaman et al., "Effect of Drilling Fluid Properties on Rate Penetration," Nafta vol. 60, No. 3, 2009, 6 pages.
Parini et al., "Chapter 3: Antenna measurements," in Theory and Practice of Modern Antenna Range Measurements, IET editorial, 2014, 30 pages.
petrowiki.org [online], "Kicks," Petrowiki, available on or before Jun. 26, 2015, retrieved on Jan. 24, 2018, retrieved from URL <https://petrowiki.org/Kicks>, 6 pages.
Ranjbar, "Cutting Transport in Inclined and Horizontal Wellbore," University of Stavanger, Faculty of Science and Technology, Master's Thesis, Jul. 6, 2010, 137 pages.
Rasi, "Hold Cleaning in Large, High-Angle Wellbores," SPE/IADC Drilling Conference, Society of Petroleum Engineers, Feb. 15-18, 1994, 12 pages.
rigzone.com [online], "How does Well Control Work?" Rigzone, available on or before 1999, retrieved on Jan. 24, 2019, retrieved from URL <https://www.rigzone.com/training/insight.asp?insight_id=304&c_id>, 5 pages.
Robinson and Morgan, "Effect of Hole Cleaning on Drilling Rate Performance," Paper Aade-04-Df-Ho-42, AADE 2004 Drilling Fluids Conference, Houston, Texas, Apr. 6-7, 2004, 7 pages.
Robinson, "Economic Consequences of Poor Solids and Control," AADE 2006 Fluids Conference and Houston, Texas, Apr. 11-12, 2006, 9 pages.
Ruiter et al., "3D ultrasound computer tomography of the breast: A new era?" European Journal of Radiology 81S1, Sep. 2012, 2 pages.
sageoiltools.com [online] "Fluid Level & Dynamometer Instruments for Analysis due Optimization of Oil and Gas Wells," retrieved from URL <http://www.sageoiltools.com/>, retrieved on Mar. 27, 2020, available on or before 2019, 3 pages.
Schlumberger, "CERTIS: Retrievable, single-trip, production-level isolation system," www.slb.com/CERTIS, 2017, 2 pages.
Schlumberger, "First Rigless ESP Retrieval and Replacement with Slickline, Offshore Congo: Zeitecs Shuttle System Eliminates Need to Mobilize a Workover Rig," slb.com/zeitecs, 2016, 1 page.
Schlumberger, "The Lifting Business," Offshore Engineer, Mar. 2017, 1 page.
Schlumberger, "Zeitecs Shuttle System Decreases ESP Replacement Time by 87%: Customer ESP riglessly retrieved in less than 2 days on coiled tubing," slb.com/zeitecs, 2015, 1 page.
Schlumberger, "Zeitecs Shuttle System Reduces Deferred Production Even Before ESP is Commissioned, Offshore Africa: Third Party ESP developed fault during installation and was retrieved on rods, enabling operator to continue running tubing without waiting on replacement," slb.com/zeitecs, 2016, 2 pages.
Schlumberger, "Zeitecs Shuttle: Rigless ESP replacement system," Brochure, 8 pages.
Schlumberger, "Zeitecs Shuttle: Rigless ESP replacement system," Schlumberger, 2017, 2 pages.
Sifferman et al., "Drilling cutting transport in full scale vertical annuli," Journal of Petroleum Technology 26.11, 48th Annual Fall Meeting of the Society of Petroleum Engineers of AIME, Las Vegas, Sep. 30-Oct. 3, 1973, 12 pages.
slb.com' [online], "Technical Paper: ESP Retrievable Technology: A Solution to Enhance ESP Production While Minimizing Costs," SPE 156189 presented in 2012, retrieved from URL <http://www.slb.com/resources/technical_papers/artificial_lift/156189.aspx>, retrieved on Nov. 2, 2018, 1 pages.
slb.com' [online], "Zeitecs Shuttle Rigless ESP Replacement System," retrieved from URL <http://www.slb.com/services/production/artificial_lift/submersible/zeitecs-shuttle.aspx?t=3>, available on or before May 31, 2017, retrieved on Nov. 2, 2018, 3 pages.
Sulzer Metco, "An Introduction to Thermal Spray," Issue 4, 2013, 24 pages.
Unegbu Celestine Tobenna, "Hole Cleaning Hydraulics," Universitetet o Stavanger, Faculty of Science and Technology, Master's Thesis, Jun. 15, 2010, 75 pages.
Weatherford, "RFID Advanced Reservoir Management System Optimizes Injection Well Design, Improves Reservoir Management," Weatherford.com, 2013, 2 pages.
Wei et al., "The Fabrication of All-Solid-State Lithium-Ion Batteries via Spark Plasma Sintering," Metals, 7, 372, 2017, 9 pages.
Wellbore Service Tools: Retrievable tools, "RTTS Packer," Halliburton: Completion Tools, 2017, 4 pages.
wikipedia.org [online] "Optical Flowmeters," retrieved from URL <https://en.wikipedia.org/wiki/Flow_measurement#Optical_flowmeters>, retrieved on Mar. 27, 2020, available on or before Jan. 2020, 1 page.

(56) References Cited

OTHER PUBLICATIONS wikipedia.org [online] "Ultrasonic Flow Meter," retrieved from URL <https://en.wikipedia.org/wiki/Ultrasonic_flow_meter> retrieved on Mar. 27, 2020, available on or before Sep. 2019, 3 pages.

wikipedia.org [online], "Surface roughness," retrieved from URL <https://en.wikipedia.org/wiki/Surface_roughness> retrieved on Apr. 2, 2020, available on or before Oct. 2017, 6 pages.

Williams and Bruce, "Carrying Capacity of Drilling Muds," Journal of Petroleum Technology, 3.04, vol. 192, 1951, 10 pages.

Xia et al., "A Cutting Concentration Model of a Vertical Wellbore Annulus in Deep-water Drilling Operation and its Application," Applied Mechanics and Materials, vol. 101-102, Sep. 27, 2011, 5 pages.

Xue et al., "Spark plasma sintering plus heat-treatment of Ta-doped Li7La3Zr2O12 solid electrolyte and its ionic conductivity," Mater. Res. Express 7 (2020) 025518, 8 pages.

Zhan et al. "Effect of β-to-α Phase Transformation on the Microstructural Development and Mechanical Properties of Fine-Grained Silicon Carbide Ceramics." Journal of the American Ceramic Society 84.5, May 2001, 6 pages.

Zhan et al. "Single-wall carbon nanotubes as attractive toughening agents in alumina-based nanocomposites." Nature Materials 2.1, Jan. 2003, 6 pages.

Zhan et al., "Atomic Layer Deposition on Bulk Quantities of Surfactant Modified Single-Walled Carbon Nanotubes," Journal of American Ceramic Society, vol. 91, Issue 3, Mar. 2008, 5 pages.

Zhang et al, "Increasing Polypropylene High Temperature Stability by Blending Polypropylene-Bonded Hindered Phenol Antioxidant," Macromolecules, 51(5), pp. 1927-1936, 2018, 10 pages.

Zhu et al., "Spark Plasma Sintering of Lithium Aluminum Germanium Phosphate Solid Electrolyte and its Electrochemical Properties," University of British Columbia; Nanomaterials, 9, 1086, 2019, 10 pages.

PCT International Search Report and Written Opinion in International Appln. No. PCT/US2021/042714, dated Nov. 16, 2021, 18 pages.

Chatar et al., "Determining Rig State from Computer Vision Analytics," SPE/IADC-204086-MS, Society of Petroleum Engineers, Mar. 2021, 15 pages.

Hegde et al., "Application of Real-time Video Streaming and Analytics to Breakdown Rig Connection Process," OTC-28742-MS, presented at the Offshore Technology Conference, Houston, Texas, USA, Apr. 2018, 14 pages.

Mehrad et al., "Developing a new rigorous drilling rate prediction model using a machine learning technique," Journal of Petroleum Science and Engineering, Sep. 2020, 192, 27 pages.

\* cited by examiner

AUTOMATIC ANALYSIS OF DRILL STRING DYNAMICS

TECHNICAL FIELD

This disclosure relates to automatic analysis of well equipment dynamics, for example, a drill string being run into a well.

BACKGROUND

Drill rigs are used for drilling and producing hydrocarbons from a well, and include a large number of components and tools that perform complex and often time-consuming operations. Drilling a well is a challenging procedure due to the inability to see the trajectory of the well, rock formations, and the harsh environment downhole. These factors and the many uncertainties and variables during a drilling operation on a rig creates a dynamic drilling process.

SUMMARY

One of the primary activities during a drilling operation is the breaking of subterranean rocks to deepen a wellbore. In this activity, it is important to select a bottom hole assembly (BHA) configuration and drilling parameters (for example, weight on bit (WOB), gallons per minute (GPM), and rotations per minute (RPM)) that achieve efficient drilling operations while preserving the integrity of downhole components of the drilling system. Lateral, axial, and tangential vibrations and stick-slip on a drill string are among the unwanted effects during a drilling operation. These effects are the result of a combination of the multiple components and physics, and may be avoided by using drilling parameters outside of the harmonic frequencies of the drilling system.

In one existing approach, surface drilling parameters, such as stand pipe pressure (SPP), WOB, RPM, hook load, and hook height, are used to approximate the behavior of downhole drilling parameters. In theory, these drilling parameters can be used to determine downhole conditions in order to approximate downhole vibrations. However, the noisy nature of the surface drilling data and lack of standardization makes this a challenging task. In another existing approach, downhole sensors are utilized to directly monitor downhole conditions. However, the data collected by these sensors are not available for real-time applications because it is not possible to transmit all the downhole data through mud pulses or because of a lack of wired pipe. Furthermore, manual selection of the drilling parameters during drilling is a challenging task as the parameters depend on various geological factors (for example, lithology), mechanical, and physical factors (for example, type of the drilling bit, BHA, among others).

Aspects of the subject matter described in this specification may be embodied in methods that include the actions of: capturing, using an image sensor directed at a drilling system, an image feed of movement of a component of the drilling system with respect to a vertical reference line; converting the image feed into a digital representation of the movement of the component, the digital representation including a number of offset pixels from the component to the vertical reference line in the image feed; converting the digital representation into a machine learning (ML), the ML representation including a plurality of vectors each including the number of offset pixels from the component to the vertical reference line at a respective time; training a ML model using the ML representation to characterize the movement of the component as normal or abnormal; and using the trained ML model to characterize the movement of the component in real-time as normal or abnormal.

The previously-described implementation is applicable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, the image sensor includes a network of image sensors arranged about the drilling rig at respective angles, and the image feed includes a plurality of image feeds capturing the movement of the component from a plurality of angles.

In some implementations, each vector of the ML representation includes an indication of offset pixels from the component to the vertical reference line in the plurality of image feeds at the respective time.

In some implementations, the component is a drill string, and capturing, using the image sensor, the image feed of the movement of the component includes capturing the movement of the drill string with respect to the vertical reference line at a plurality of predetermined survey points along the vertical reference line.

In some implementations, characterizing the movement of the component in real-time as abnormal includes characterizing the movement as stick-slip, axial vibration, tangential vibration, or lateral vibration.

In some implementations, the component is a drilling rig, and characterizing the movement of the component in real-time as abnormal includes characterizing the movement as a rig misalignment or a derrick misalignment.

In some implementations, the method further includes training the ML model using the image feed to characterize drilling operations, lithology changes, and kick off points in real-time.

In some implementations, the ML representation is further based on drilling surface parameters of the drilling rig.

In some implementations, the method further includes in response to characterizing movement of the component in real-time as abnormal, performing a remedial action.

In some implementations, the remedial action includes displaying a representation of the abnormal movement on the control panel.

In some implementations, the remedial action includes triggering an alarm.

In some implementations, the remedial action includes controlling the drilling system to adjust a drilling parameter, perhaps while drilling a wellbore.

In some implementations, the method further includes in response to characterizing movement of the component in real-time as abnormal, transmitting a signal to drive a controllable device. In some implementations, the controllable device is in a remote location (for example, in a location that is not local to the rig). For example, the controllable device is in a control room. In some implementations, the controllable device includes a control panel in a control room, and the signal can drive the control panel to display a representation of the abnormal movement. In some implementations, the controllable device includes an alarm (remote or local), and the signal can trigger the alarm (audio or visual). In some implementations, the controllable device includes a running tool that is running the drill string into or out of the well, and the signal causes the drill string to adjust a rate at which the running tool is running the drill string into or out of the well.

The subject matter described in this specification can be implemented to realize one or more of the following advantages. Downhole components and drilling parameters should be carefully selected before and during drilling operations to improve the efficiency and safety of drilling operations. Current drilling operations rely primarily on the individual expertise of drillers that make decisions on a drilling rig. The types of decision that can be made by such drillers is limited. Conversely, the disclosed system performs real-time analysis of drill string dynamics to facilitate prompt identification of: lateral vibrations (whirl, shock), axial vibrations (bit bounce), tangential vibrations (high frequency torsional oscillations), stick-slip, drilling rig alignment (sinking drilling rig due to fractured/uneven foundation lithology), drilling operations (for example, drilling, stationary drill string, reaming, tripping in, and tripping out), tripping out/in speed for swab and surge analyses, lithology identification, and kick off point for deviated wells.

Furthermore, the disclosed system mitigates unwanted drill string dynamics, thereby avoiding events such as: drill string fatigue, stabilizer blade or collar outer diameter damage, damaged shoulder and drill bit cutters, reduced rate of penetration (ROP), over-gauged hole, drill bit damage (chipped or broker cutters), drill bit bearing failures, BHA component failures, BHA component damage, electronic failures, loss of steering control, reduced logging while drilling (LWD) measurement quality, and wellbore path deviation.

The processes performed by the system facilitate a successful, efficient, and safe drilling of a well into a target hydrocarbon reservoir and provide real-time updates on drilling efficiency, and any encountered or predicted challenges. Further, the system can be utilized to improve the way raw data is extracted from sensors, analyzed and turned into useful information. This can then be leveraged with the knowledge and experience of drilling engineers to optimize drilling operations. Further, the system can automate and optimize drilling operations by predicting, mitigating, or preventing major challenges, such as, drill string fatigue, damage and failure of the downhole components, reduced ROP, wellbore quality, among others.

The details of one or more implementations of the subject matter of this specification are set forth in the Detailed Description, the accompanying drawings, and the claims. Other features, aspects, and advantages of the subject matter will become apparent from the description, the claims, and the accompanying drawings.

DETAILED DESCRIPTION

Figure 1:
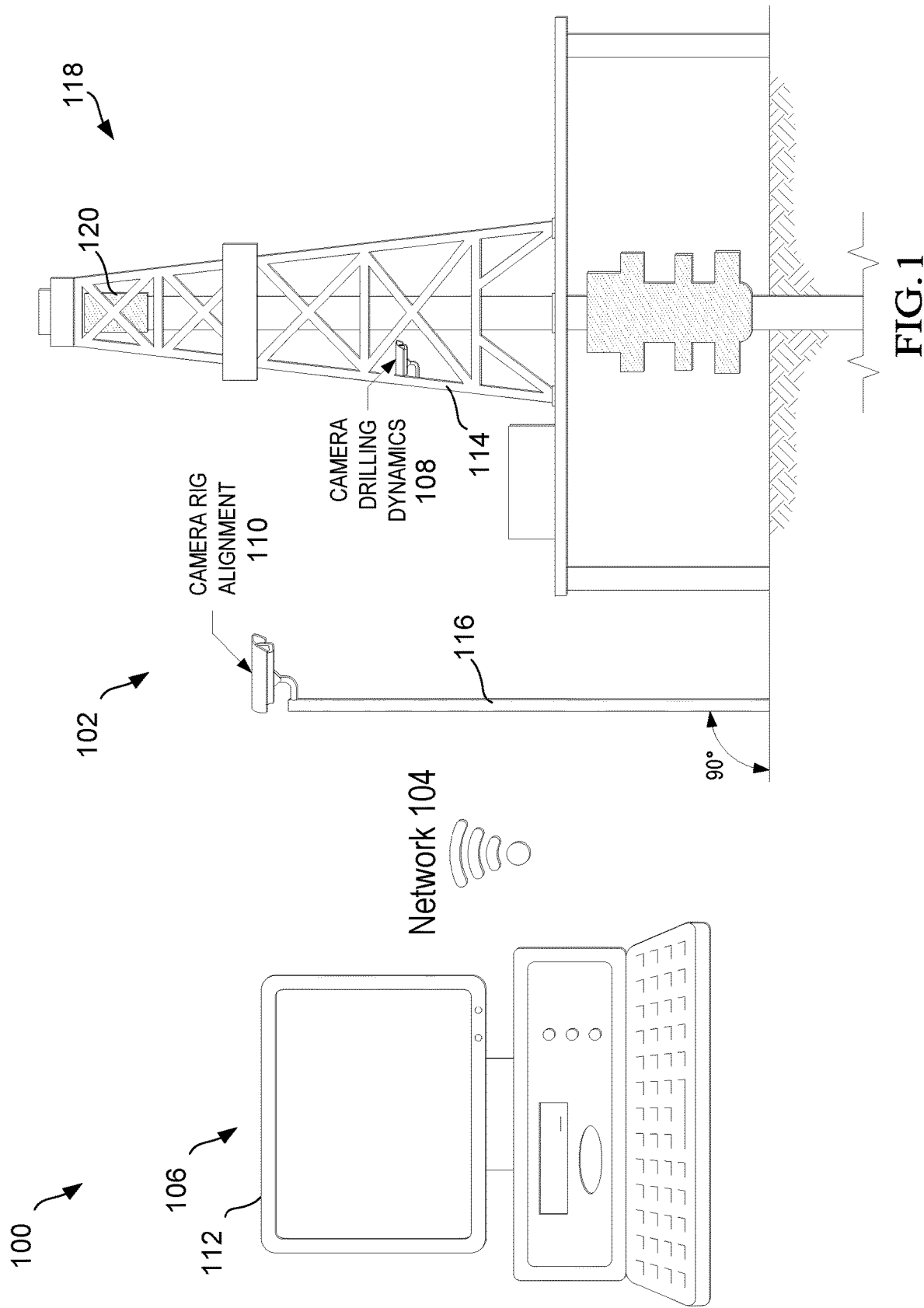
FIG. 1 illustrates a schematic view of an example monitoring system, according to some implementations of the present disclosure.

This disclosure describes a monitoring system that performs intelligent monitoring and characterization of: (i) well components of a drilling rig, (ii) current operations of the drilling rig, and (iii) lithology of a formation into which the drilling rig is drilling a wellbore. In particular, the monitoring system performs autonomous image-based characterization of drill string dynamics and rig alignment in real-time. In this system, artificial intelligence (AI) models are trained and utilized to perform the image-based characterization. Other embodiments of the system may consist of only image processing algorithms (such as, background subtraction, centroid identification, and integral image algorithm, among others) or a combination of such techniques and AI algorithms. Additionally, the monitoring system generates automatic and real-time drilling recommendations, for example, to mitigate unwanted drilling dynamics or rig misalignments. In some examples, the monitoring system autonomously acts based on the drilling recommendation. In this disclosure, the term "real-time" can correspond to events that occur within a specified period of time, such as within one minute, within one second, or within milliseconds.

In an embodiment, the monitoring system is an internet of things (IoT) platform that is deployed on a drilling rig. The system includes smart, waterproof, high-resolution, wireless cameras, or other image sensors, for capturing image streams of the drilling rig. Additionally, the system includes computing hardware and software based on AI models (for example, machine learning (ML) and deep learning (DL) models) for processing the captured image streams. The system serves as the foundation for enabling analysis of new sensors and data streams in real-time to provide advanced solutions for improving drilling operations.

To perform autonomous characterization of drill string dynamics in real-time, the monitoring system uses an image sensor, or a network of image sensors, to observe dynamics of a drill string at the surface. The monitoring system combines surface drilling parameters and the observed dynamics to train AI models to perform the characterization of drill string dynamics in real-time. In some examples, the AI models are trained using image streams of drill strings from one or more wells. The models are then used to accurately identify unwanted drill string vibrations based on image feeds from image sensors that are monitoring drill strings in the field.

To perform autonomous characterization of rig alignment of a drilling rig, the monitoring system uses another image sensor, or another network of image sensors, to observe a drilling rig. The monitoring system uses the image stream captured by the image sensor to identify a rig alignment condition, such as rig or derrick misalignment.

The monitoring system also determines and performs corrective actions to mitigate identified unwanted drill string dynamics or rig alignment conditions. For example, the monitoring system can mitigate unwanted drill string dynamics, such as, vibrations and stick slip, by adjusting drilling parameters, such as weight on bit (WOB) and rotations per minute (RPM) of a drilling bit.

Additionally, the monitoring system can monitor and characterize operations and lithology based on image streams from image sensors at a drilling rig. The operations include drilling operations, such as rotary drilling, sliding drilling, stationary drill string, reaming, tripping in, tripping out, and tripping out/in speed for different analyses including swab and surge. Lithology characterization includes identification of formation tops and identification of a kick-off point for deviated wells.

Within examples, the unwanted drill string dynamics that can be identified by the monitoring system include lateral vibrations (for example, whirl and shock), axial vibrations (for example, bit bounce), tangential vibrations (for example, high frequency torsional oscillations), stick-slip, drilling rig misalignment (for example, due to movement caused by derrick vibrations), and sinking drilling rig (for example, due to fractured lithology or weak foundation supporting the rig). The lateral vibrations can cause drill string fatigue, BHA impact damage and component failure, stabilizer blade or collar outer diameter damage, damaged shoulder and drill bit cutters, reduced rate of penetration (ROP), and an over gauged hole. The axial vibrations can cause drill bit damage (for example, chipped or broker cutters), drill bit bearing failures (for example, tri-cone bits), and BHA component failures. The tangential vibrations can cause BHA component damage and electronic failures. Stick-slip can cause reduced ROP, loss of steering control, and reduced logging while drilling measurement quality. Misalignment of the drilling rig can cause interruption of operations, excessive friction at the surface casing/rotary table/blowout preventers (BOPs), surface equipment damage, and complications on the pipe handling operations. And the drilling rig sinking can cause a high risk of rig collapse and other safety issues.

FIG. 1 illustrates an example monitoring system 100 for monitoring a drilling rig 118, according to some implementations. The drilling rig 118 may be similar or identical to rig system 800 of FIG. 8. As shown in FIG. 1, one or more elements of the monitoring system 100 are installed in proximity of the drilling rig 118. As also shown in FIG. 1, the monitoring system 100 includes an image sensor installation 102 that is communicatively coupled to an edge gateway 106 via network 104. The network 104 may include wired connections, wireless connections, or both. The image sensor installation 102 includes one or more image sensors that capture one or more image feeds of the drilling rig. The image sensor installation 102 provides the captured image feeds to the edge gateway 106 via the network 104. The edge gateway 106 receives and processes the image feeds in order to perform intelligent monitoring, characterization, and control of well components on the drilling rig.

In an embodiment, the image sensor installation 102 includes image sensors 108, 110 that each capture a respective image feed of one or more components of the drilling rig 118. Specifically, the image sensor 108 captures an image feed of components associated with drilling dynamics, and the image sensor 110 captures an image feed of components associated with rig alignment. The image sensors 108, 110 can take a variety of forms. For example, the image sensors 108, 110 can include cameras, such as cameras that are smart, waterproof, high-resolution, wireless, or a combination of these features. The image sensors 108, 110 can also include a charge-coupled device (CCD) camera, a machine vision camera, a CCD machine vision camera, a digital camera, an infrared camera, an x-ray camera, a thermal camera, an acoustic camera, an ultraviolet camera, an ultrasonic imaging camera, a magnetic resonance imaging (MM) camera, a gamma ray camera, computed tomography (CT) scanner, a point cloud scanner, a laser scanner, a LiDAR scanner, or a combination of these. In some examples, the image sensors 108, 110 include optical filters, such as ultraviolet (UV) filters, infrared (IR) filters, or a combination of these, or other filter types. The image sensors 108, 110 can have a resolution that is sufficient for identifying components with sizes on the order of approximately 50 micrometers (mm).

In an embodiment, the image sensor 108 performs a non-invasive image capture of drill string dynamics and provides the image feed to the edge gateway 106. As shown in FIG. 1, the image sensor 108 is mounted, for example, on a drilling beam 114. In one example, the field of view of the image sensor 108 on a drill string 120 is greater than 20 feet (ft). The image sensor 108 may have other field of views as well. Further, while the monitoring system 100 shows only one image sensor 108 for capturing drill string dynamics, the monitoring system 100 can include more than one image sensor, such as a plurality of cameras positioned on the drilling beam 114 or about the drill string component. Note that the image sensor 108 can be disposed anywhere about the drilling rig 118, given that the image sensor 108 is directed at the drill string 120 to provide the image feed of the drill string 120. In some implementations, the image sensor 108 is mounted on a movable support that can move and position the image sensor 108, for example, to follow a particular component over multiple views or during movement of the component, switch from one component to another, or a combination of these.

In an embodiment, the image sensor 110 performs a non-invasive image capture of rig alignment and provides the image feed to the edge gateway 106. As shown in FIG. 1, the image sensor 110 is mounted, for example, on an external structure 116 that is not attached to the drilling rig 118. While the monitoring system 100 shows only one image sensor 110 for capturing rig alignment, the monitoring system 100 can include more than one image sensor, such as a plurality of cameras positioned on the external structure 116. Note that the image sensor 110 can be disposed anywhere about the drilling rig 118, given that the image sensor 110 is directed at the drilling rig 118 to provide an image feed of the drilling rig 118. In some implementations, the image sensor 110 is mounted on a movable support that can move and position the image sensor 110, for example, to follow a particular component over multiple views or during movement of the component, switch from one component to another, or a combination of these.

In some embodiments, the monitoring system 100 includes an audio sensor in addition to or instead of the image sensor installation 102. The audio sensor can capture audio and provide an audio feed to the edge gateway 106. In some implementations, the edge gateway 106 can process the audio feed from the audio sensor in conjunction with the image feeds from the image sensor installation 102 to identify one or more properties or components of the drilling rig 118.

In an embodiment, the edge gateway 106 is positioned onsite, or locally, on the drilling rig 118, and operates as an edge/fog computing system. As such, the edge gateway 106 includes computing components located onsite, in that the computing components that perform the analysis of the image feeds from the image sensor installation 102 are located locally on the drilling rig 118. This edge/fog computing setup of the edge gateway 106 localizes processing and analysis at the edge gateway 106, for example, without the need for transferring information and data or outsourcing analysis to a remote computing system in order to function. The edge gateway 106 includes one or more processors and a computer-readable storage medium used in the reception and analysis of the input from the image sensor installation 102, as described in more detail later. For example, the edge gateway 106 can be a computer, a processing board, a programmable logic gateway, an edge/fog computer, or any suitable computing device with input and output capabilities.

In an embodiment, the edge gateway 106 receives respective image feeds from one or more image sensor installations 102 at one or more wells. One type of image feed, for example, from the image sensor 108, captures drill string dynamics at a drilling rig 118. In particular, this image feed captures motion patterns of the drill string at different fixed survey points. The edge gateway 106 uses this image feed to analyze the motion patterns of the drill string 120 at the different fixed survey points. Based on the analysis, the edge gateway 106 identifies a number of offset pixels from the drill string 120 relative to a fixed reference vertical line at different heights. An AI model then uses the number of offset pixels to determine whether an unwanted drill string dynamic is occurring at that well. Note that, as described herein, the AI model may be generated based on image feeds from one or more image sensor installations at one or more wells.

Another image feed, for example, from the image sensor 110, captures an alignment of a drilling rig 118 at a well. The edge gateway 106 uses this image feed to compare an orientation of a rig mast to a fixed vertical reference line. Based on the comparison, the edge gateway 106 can identify a rig alignment condition. In an example, the edge gateway 106 identifies the rig alignment condition by determining that the difference between the orientation of the rig mast and the fixed vertical reference line is greater than a threshold. The rig misalignment may be due to movement caused by derrick vibrations, sinkholes, or weak foundation supporting the drilling rig.

The edge gateway 106 can also propose (and in some example, act on) a fix or reaction for the identified condition in real-time. Real-time, for example, can mean that the image feeds are provided continuously and instantaneously from the image sensor installation 102 to the edge gateway 106, and the identification and determination of a particular condition occurs instantaneously or nearly instantaneously.

As described, the edge gateway 106 receives image feeds from image sensor installation 102. The edge gateway 106 is configured to process and analyze the image feeds in order to identify one or more conditions of the drilling rig 118. The processing and analysis of the image feeds can include identifying a number of offset pixels from the drill string, the drill mast, or both, to respective reference lines. Then, based on the comparison, the edge gateway 106 determines a drill string dynamic condition or a rig alignment condition. Based on this determination, the edge gateway 106 can prompt an automation rule. The automation rule can vary and can include sending a signal or instructions to drive a controllable device, as described in greater detail later. In some instances, the edge gateway 106 can propose, act on, or both propose and act on a proactive, preventative action. As an example, the edge gateway 106 can display the actionable items or recommendations on a display 112 in real-time for a rig crew. Additionally, the actionable items or recommendations can be sent to headquarters via a satellite. As another example, the edge gateway 106 can adjust drilling parameters, such as WOB and RPM of a drilling bit.

In some embodiments, the edge gateway 106 processes and analyzes the image feeds in order to characterize operations of the drilling rig 118 and lithology of a subterranean formation in which the drilling rig 118 is drilling a wellbore. For example, the edge gateway 106 uses the image feeds to characterize drilling operations (for example, rotary drilling, sliding drilling, stationary drill string, reaming, tripping in, and tripping out) and for tripping out/in speed for different analyses including swab and surge. In order to characterize the drilling operations, the edge gateway 106 may analyze image feeds (for example, from image sensors 108, 110 or other sensors) to monitor one or more components associated with the drilling operations. For example, the position of drill string tool joints can be monitored during drilling operations.

Additionally, the edge gateway 106 can use the image feeds along with the drilling parameters (WOB, ROP, and hook load, among others) to identify formation tops and a kick-off point for deviated wells. Traditionally, the sudden changes in ROP or the inverse ROP have been used to identify formation top changes during drilling operations. However, these changes may occur due to factors other than the formation tops, such as, drilling bit condition, drill string vibrations, and improper hole cleaning, among others. The disclosed system uses the drilling parameters in conjunction with the video captured by the camera 108 to discriminate between changes in drill string behavior and ROP due to unwanted vibrations, changes in formation tops, or kick off points.

The edge gateway 106 can include one or more applications that can be run to cause the edge gateway 106 to perform various operations. The onsite edge gateway 106 can acquire data from the one or more sensors, and the data can be sent to a process layer, where one or more processing operations can be performed. For example, the processing operations in the process layer can include analog signal processing, digital signal processing, image/video processing, pattern recognition, edge detection, wavelet transform processing, pixelated processing, texture processing, component-based approach connectivity operations, principal component analysis, independent component analysis, descriptors based methods, linear filtering, anisotropic diffusion operations, grey-level segmentation, image thresholding, spatial domain filtering, frequency domain filtering, or any combination of these operations. The processed data from the process layer can be sent to an analysis module. The analysis module can perform one or more analysis operations. For example, the analysis operations in the analysis module can include AI algorithms, including unsupervised learning, ML, and/or DL, based on outlier detection, failure, or prediction models. Such algorithms can be based on data-driven models, physics models, or models that are both physics- and data-driven. The analysis operations are performed to identify patterns in the data. Predictions can be made from the identified patterns to mitigate or prevent problems, for example, associated with drill string dynamics or rig alignment. The acquired data, processed data, results from the processing operations, results from the analysis operations, or a combination of these can be stored on the edge gateway 106.

The edge gateway 106 can communicate with and actuate other components of the drilling system. For example, the edge gateway 106 can automatically initiate an intervention action on the rig system or provide a notification to an operator to instruct the operator to perform a manual intervention action on the rig system. The edge gateway 106 can transmit a signal to actuate a component of the rig system (for example, raise an alarm or suggest a recommendation to increase or reduce any drilling parameter, such ROP, WOB, and flow rate, among others). The edge gateway 106 can transmit a signal to initiate drilling dynamics operations or measurements. The edge gateway 106 can transmit a signal to initiate, change, or stop drilling hydraulics operations or measurements. The edge gateway 106 can transmit a signal to raise a warning, an alarm, trip a safety mechanism, or trigger another health and safety-related action. The edge gateway 106 can transmit a signal to improve drilling optimization, automation, or both. For example, the edge gateway 106 can provide a parameter used in drilling optimization, automation, or both. In some implementations, one or more parameters can be transmitted to the edge gateway 106 from one or more components of the rig system to improve operations and calculations performed by the edge gateway 106. In some examples, operations and calculations performed by the onsite edge gateway 106 occur locally on the drilling rig 118.

In some embodiments, the edge gateway 106 can be communicatively coupled to a cloud. The cloud can be used to store data acquired by the edge gateway 106. The cloud can be used to store large amounts of data, for example, terabytes of data as well as to perform more computational demanding analyses, such as finite element analysis or similar. Various operations can be performed in the cloud separately from the edge gateway 106. For example, AI algorithms, ML/DL models, big data analytics, or any combination of these can be performed in the cloud. In some implementations, one or more optimization parameters can be determined by any one or more of such operations, and the one or more optimization parameters can be transmitted to the edge gateway 106 to improve operations and calculations performed by the edge gateway 106. The operations performed in the cloud need not occur locally on the rig.

Figure 2:
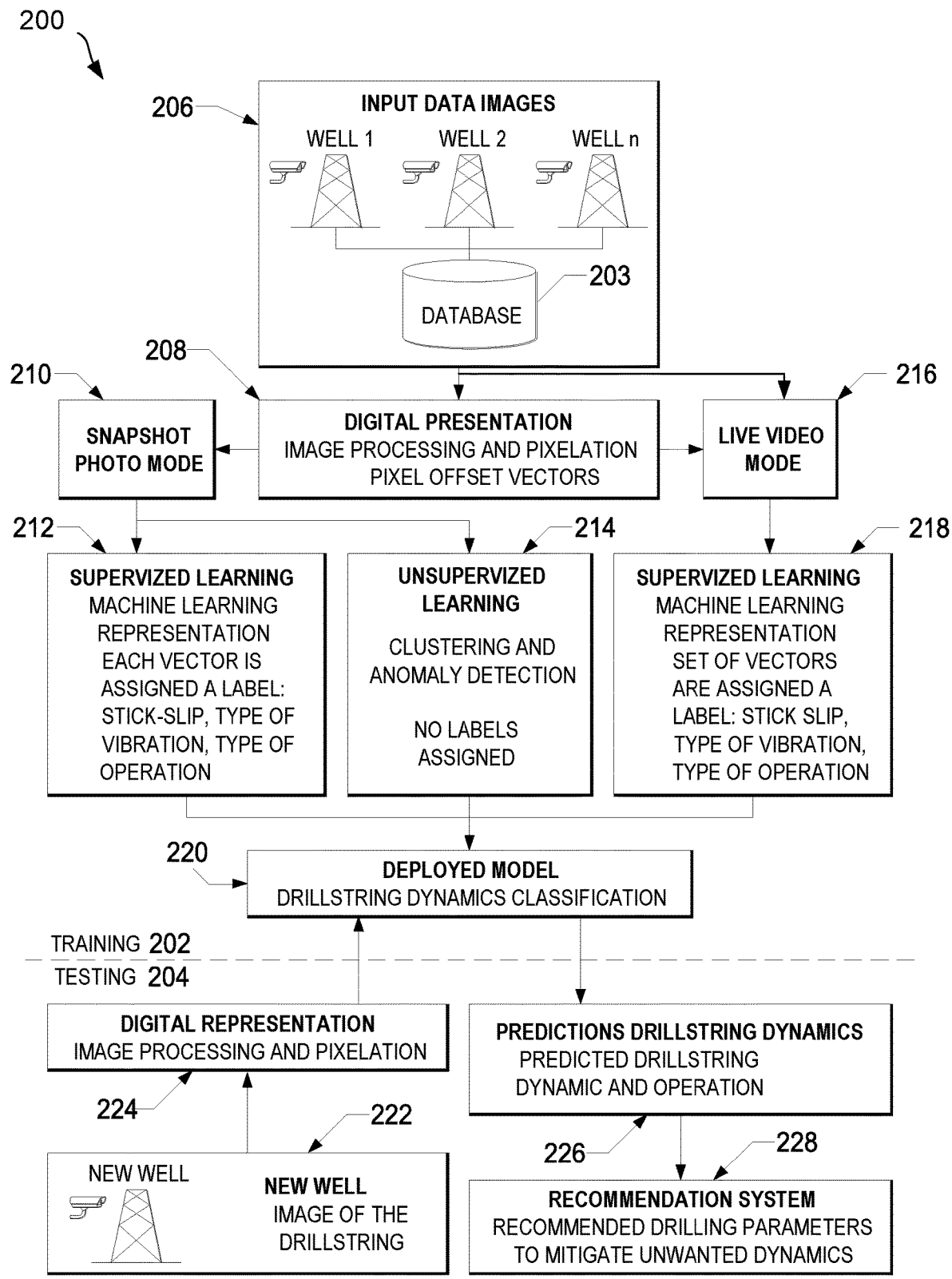
FIG. 2 illustrates a workflow for training and testing an artificial intelligence model for the characterization of drill string dynamics, according to some implementations of the present disclosure.

FIG. 2 illustrates a workflow 200 for training and testing an AI model for characterizing drill string dynamics, according to some implementations. For clarity of presentation, the description that follows generally describes the workflow 200 in the context of the other figures in this description. For example, the workflow can be performed by the computer system 900 shown in FIG. 9. However, it will be understood that the workflow 200 may be performed, for example, by any suitable system, environment, software, and hardware, or a combination of systems, environments, software, and hardware, as appropriate. In some implementations, various steps of the workflow 200 can be run in parallel, in combination, in loops, or in any order.

As shown in FIG. 2, the workflow 200 is split into two phases: a training phase 202 and a testing phase 204. The training phase 202 involves training an AI/ML/DL model, and the testing phase 204 involves testing, utilizing, and refining the AI/ML/DL model.

The training phase 202 starts at step 206. At step 206, one or more than one image sensor at one or more wells records image feeds of one or more drill strings. The image sensors may be similar or identical to image sensor 108 of FIG. 1, which is configured for capturing drill string dynamics. In FIG. 2, respective image sensors at n wells record respective drill strings at the wells, where n is a positive integer. As described previously, an image sensor captures images or live video of a drill string in an image feed. The image feed from each of the image sensors at the one or more wells is stored in a database 203 for processing. The database 203 may, for example, be included in an edge gateway (not illustrated in FIG. 2).

At step 208, image and pixelation techniques are used, by a computing device (for example, the edge gateway 106), to convert the drill string behavior captured by each of the image feeds into a digital representation. In particular, the computing device encodes each image feed into samples defined by offset pixels and assigned drill string dynamic or operation labels.

Figure 3:
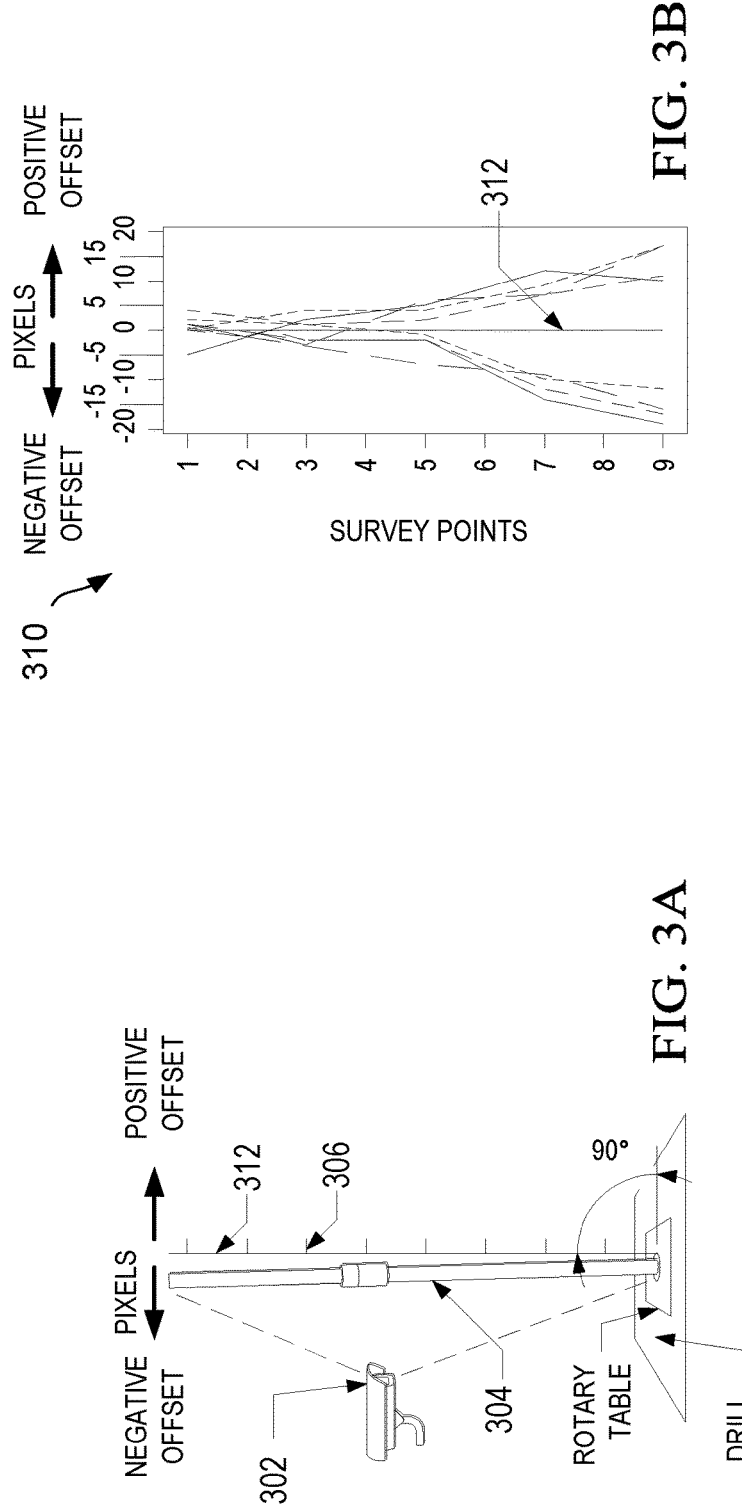
FIGS. 3A, 3B, and 3C illustrate an example process for characterizing drill string dynamics, according to some implementations of the present disclosure.

FIGS. 3A, 3B, and 3C illustrate an example process for characterizing drill string dynamics, according to some implementations. As shown in FIG. 3A, an image sensor 302 captures an image feed of a drill string 304. The image sensor 302 captures drill string behavior along one or more survey points, such as survey point 306. In this example, there are nine survey points. At each of the survey points, the image sensor 302 captures offset pixels of the drill string 304 from a reference vertical line 312. Although this example uses one image sensor and nine survey points, it is possible to use multiple image sensors and a different number of survey points, perhaps at different fixed heights.

In an embodiment, the computing device uses image and pixelation techniques to convert the behavior of the drill string 304 at each time step tn into a digital representation 310 shown in FIG. 3B. The digital representation 310 plots a number of offset pixels from the reference vertical line 312 at each of the survey points. As shown in FIG. 3B, the digital representation 310 plots the number of offset pixels at each of the nine survey points. The digital representation 310 is then converted to a ML representation.

FIG. 3C illustrates a ML representation 314 that is converted from the digital representation 310. In an example, the digital representation 310 is converted to the ML representation 314 by generating, for each tn, a vector of length equal to the number of survey points. The vector represents the number of offset pixels relative to the reference vertical line 312 at each survey point. Therefore, the vector containing the offset pixels at tn represents a sample $S_{tn}$, such that $S_{tn}=\{x_1, x_2, \ldots, x_n\}: y_{tn}$ where $x_i$ represent negative/positive pixel offsets at the survey points. Furthermore, each sample is assigned a label from y ∈{drillingOperation,stick-slip, axial,tangential,lateral}. Each label in the set is indicative of a particular drill string dynamic or operation. In the case where multiple image sensors are used to capture multiple angles of the drill string, a sample $S_{tn}$ is defined as:

$$S_{tn}=\{\text{offset pixels camera \#1}\}\cup\{\text{offset pixels camera \#2}\}\cup \ldots \{\text{offset pixels camera \#m}\}: y_{tn} \quad \text{Equation (1)}$$

In Equation (1), m refers to the number of image sensors.

In some embodiments, the information or features extracted from an image sensor are synchronized with other sensors at the rig, such as, drilling surface parameters (for example, WOB, torque [TQ], stand pipe pressure [SPP], mud flow out [FLOUT], mud flow in —[FLWIN], revolution per minute [RPM], among others), downhole data (for example, logging while drilling [LWD] and measurement while drilling [MWD]), and any other sensor at the rig, to enable other applications.

Figure 4:
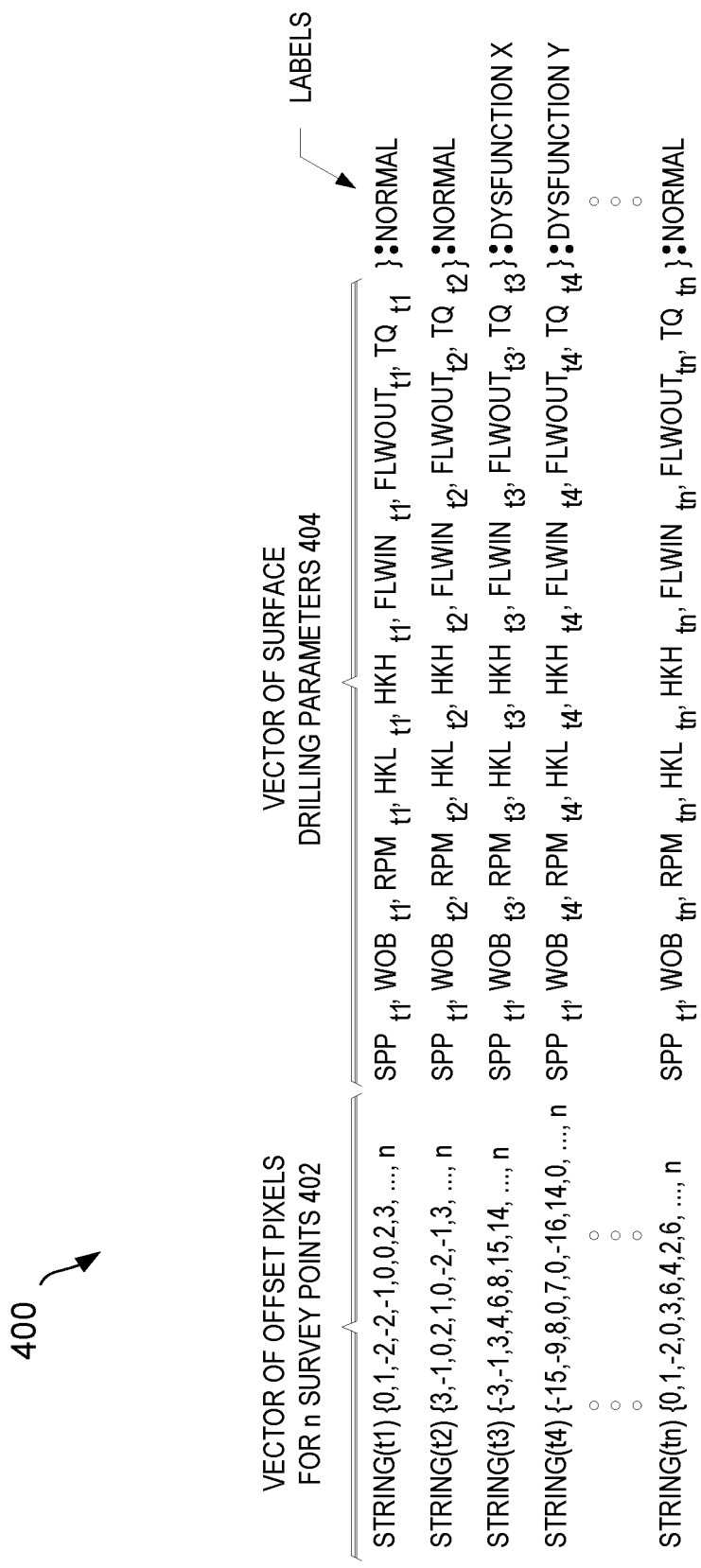
FIG. 4 illustrates a block diagram of an example recommendation system, according to some implementations of the present disclosure.

FIG. 4 illustrates a ML representation 400 that combines drill string offset encoding and surface drilling parameters, according to some implementations. As shown in FIG. 4, the ML representation 400 includes vectors of offset pixels for n survey points 402 and vectors of surface drilling parameters 404. At each time tn, the ML representation 400 is a string that includes a vector of the offset pixels for n survey points at tn and a vector of the surface drilling parameters at tn. Each string is assigned a label that is indicative of whether the string is indicative of normal operations or a particular dysfunction. The ML representation 400 may then be used for training a supervised AI/ML/DL model that can determine whether a drilling dysfunction is occurring based on image data, surface drilling parameters, or both.

In some embodiments, the ML representations, such as representation 314 of FIG. 3C and representation 400 of FIG. 4, are used as input for training supervised learning models. In other embodiments, unsupervised learning algorithms, such as, clustering, principal component analysis, among others, may be used for anomaly/outlier detection. In such embodiments, the unsupervised models would discriminate the vectors with normal operations from those with any kind of dysfunction or aberrant drill string behavior.

Returning to FIG. 2, the input image stream is processed using one of two modes: (i) a still "Snapshot" mode or (ii) a continuous recording live "Video" mode. In Snapshot mode, frames or snapshots of the image stream are taken every few seconds. The number of frames or snapshots taken may depend on processing speed. In an example, six samples per minute are captured. In "Video" mode, continuous recording and analysis is performed.

Step 210 corresponds to Snapshot mode. As shown in FIG. 2, Snapshot mode involves training both supervised models (for example, artificial neural networks, support vector machines, decision trees, among others) and unsupervised models (for example, any clustering method, and principal component analysis, among others).

In supervised training or learning 212, for each type of drill string dysfunction, a set of images are encoded into a ML representation to train a ML or DL model. As such, the ML/DL model is derived by using a set of images that have been converted into a digital representation from labeled dysfunctional and normal operation conditions. In particular, as described in FIGS. 3A-3C, each vector in the ML representation is assigned a label, such as a stick-slip, type of vibration (for example, lateral vibrations and tangential vibrations), type of operation (for example, normal operation and dysfunctional operation), or some combination of these. In some examples, multiclass ML/DL models are trained to classify lateral vibrations, tangential vibrations, stick-slip, axial vibrations, and normal operations. These models discriminate normal drill string behavior from unwanted drill string dynamics.

In unsupervised training or learning 214, unlike in supervised learning 212, the vectors indicative of the digital representation of the drill string are not associated with any labels. The ML/DL models are trained to learn the drill string behavior during normal operations and, therefore, are able to detect outliers or aberrant behavior of the drill string dynamics.

Step 216 corresponds to Video mode. This step is used for training ML/DL models with memory (for example, long-short term memory networks, recurrent neural networks, among others) using supervised learning 218. More specifically, for each type of drill string dysfunction, a ML/DL model with memory is used to identify the drill string behavior with respect to time. As opposed to Snapshot mode 210, the ML/DL models for video processing do not consider the images as individual photos. Rather, ML/DL with memory consider the photos as a video by looking at the images in a sequence. These sequences of images may be used to more accurately identify the axial vibrations, which are characterized by bit bouncing. Although the models are unable to see the drilling bit, the tools joints or connections may be used by the model as a reference to detect the bouncing of the pipe with respect to time. DL models with memory (for example, recurrent neural networks, long short term memory network, among others) enable understanding of the context of a video frame relative to the frames that came before it. Such models achieve this by passing the output of one training step to the input of the next training step along with the new frames.

For the training and validation of the supervised learning models, a nested stratified cross-validation technique is used to train and tune the ML/DL model parameters. In the nested cross-validation, the inner k-fold cross-validation is used to tune the parameters of the model and is only performed on the training data while the outer k-fold cross-validation is used to validate the final performance of the model.

At step 220, the trained and validated model is deployed for the characterization of drill string dynamics. Specifically, the trained model may now be used in the testing phase 204 for the characterization of drill string dynamics of a drilling rig. Steps 222, 224, 226, 228, relate to the testing phase 204 once the model is trained, validated, and deployed. More specifically, steps 222, 224 involve the recording of a drill string under observation and encoding the recording into a digital representation. The encoded images for the new well are provided as input for the deployed model, which outputs the drill string dynamic classification at step 226. The drill string dynamic classification is then provided to a recommendation system at step 228. For example, the recommendation system may recommend drilling parameters to mitigate unwanted dynamics.

In an embodiment, the output of the recommendation system is provided via an advisory human interface (HMI). The output, which may be audible, visual, or both, instructs a driller to change one or more drilling parameters. As an example, an alert may state "Drill string, or Top Drive vibration has exceeded safe levels—investigate!" As another example, an alert may state "Rig mast tilt angle and tilt rate of change have exceeded safe levels—reduce hookload and investigate immediately!" If the system encounters a drilling dysfunction, then the recommended actions will be displayed to the operators. If no drilling dysfunctions are detected, then the system shows the drilling operations and statistics.

In another embodiment, the output of the recommendation system is tied to an auto-driller system that makes changes to specific drilling equipment setpoint parameters to improve drilling efficiency or safety. As an example, the auto-driller can automatically reduce hookload if the rig tilt exceeds threshold (safe) operational limits. As another example, if the drill string dysfunction is a lateral vibration, then the auto-driller can automatically restart drilling, increase WOB, reduce RPM, or a combination of these. As yet another example, if the drill string dysfunction is an axial vibration, then the auto-driller can automatically increase WOB, vary WOB and ROP, or some combination of these to break the vibration pattern. As yet another example, if the drill string dysfunction is a tangential vibration, then the auto-driller can automatically reduce RPM and WOB. As yet another example, if the drill string dysfunction is stick-slip, then the auto-driller can automatically increase RPM, decrease WOB, or some combination of these.

In yet another embodiment, the output of the workflow 200 may include output parameters that are provided to the rig data network for other systems to alert personnel, change downhole tool configurations, change surface drilling system configurations or flag a potential lithology change. For example, the output parameters include, but are not limited to, rig mast angle—Degrees and minutes, rig vertical offset—meters, vibration frequency at multiple nodes—Hz and displacement.

Figure 5:
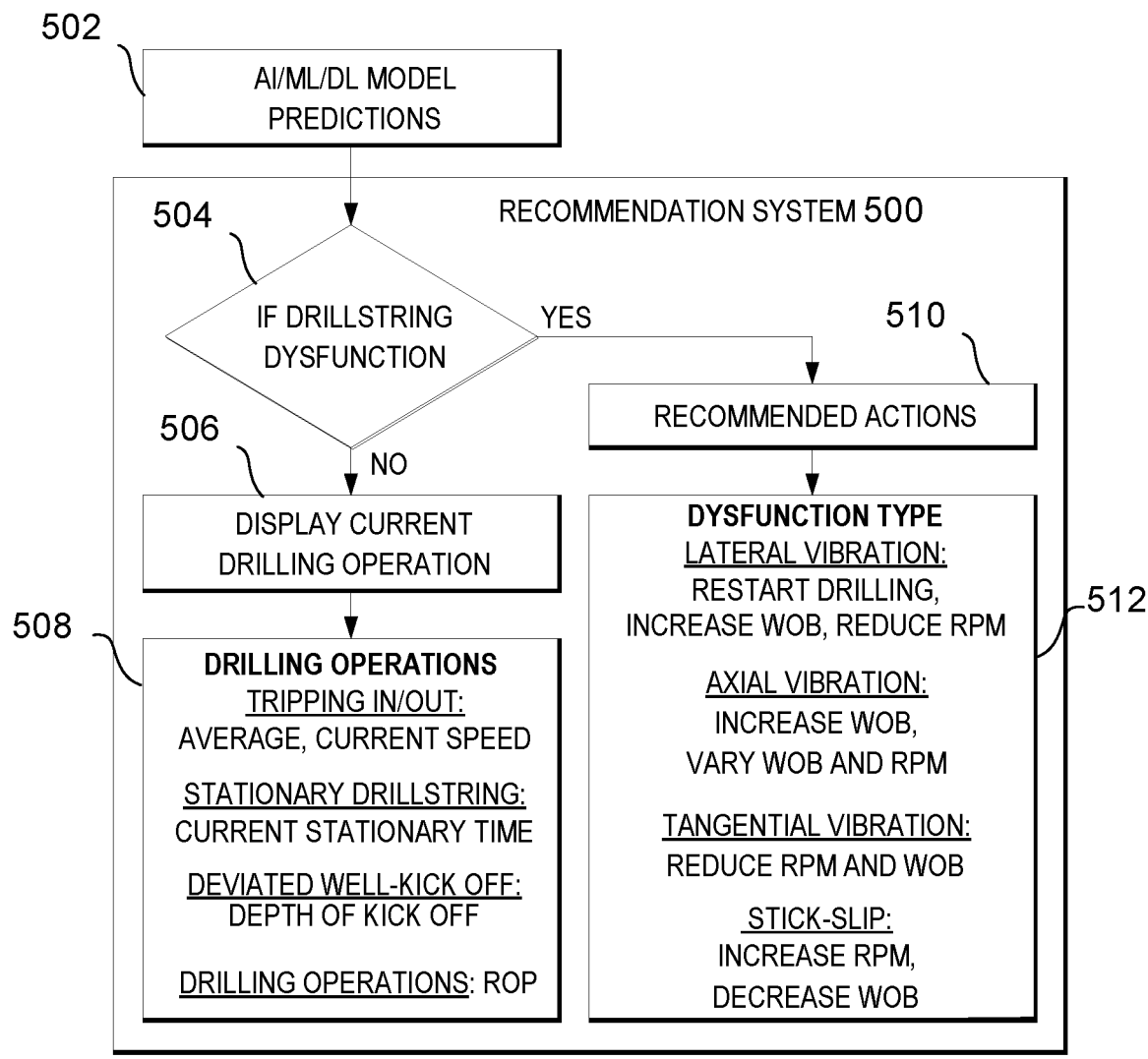
FIG. 5 illustrates a machine learning representation that combines drill string offset encoding and surface drilling parameters, according to some implementations of the present disclosure.

FIG. 5 illustrates a block diagram of an example recommendation system 500, according to some implementations. As shown in FIG. 5, at step 502 the prediction of the AI/ML/DL model is provided as an input to the recommendation system 500. At step 504, the recommendation system 500 determines whether the prediction is indicative of a drilling dysfunction. If the recommendation system 500 determines that the prediction is not indicative of a drilling dysfunction, the workflow proceeds to step 506. At step 506, the recommendation system causes a display device to display information associated with a current drilling operation. For example, as shown by block 508, if the current drilling operation is tripping in/out, the information may include average speed, current speed, or both. If the current drilling operation is a stationary drill string, the information may include a current stationary time. If the current drilling operation is a deviated well, the information may include a depth of kick off. If the current operation is a drilling operation, the information can include drilling parameters, such as ROP.

However, if the recommendation system 500 determines that the prediction is indicative of a drilling dysfunction, the workflow proceeds to step 510. At step 510, the recommendation system 500 determines a recommended action. If the drill string dysfunction is a lateral vibration, then the recommendation can be to restart drilling, increase WOB, reduce RPM, or a combination of these. If the drill string dysfunction is an axial vibration, then the recommendation can be to increase WOB, vary WOB and rate of penetration (ROP), or some combination of these. If the drill string dysfunction is a tangential vibration, then the recommendation can be to reduce RPM and WOB. If the drill string dysfunction is stick-slip, then the recommendation can be one of increase RPM, decrease WOB, or some combination of these.

Figure 6A:
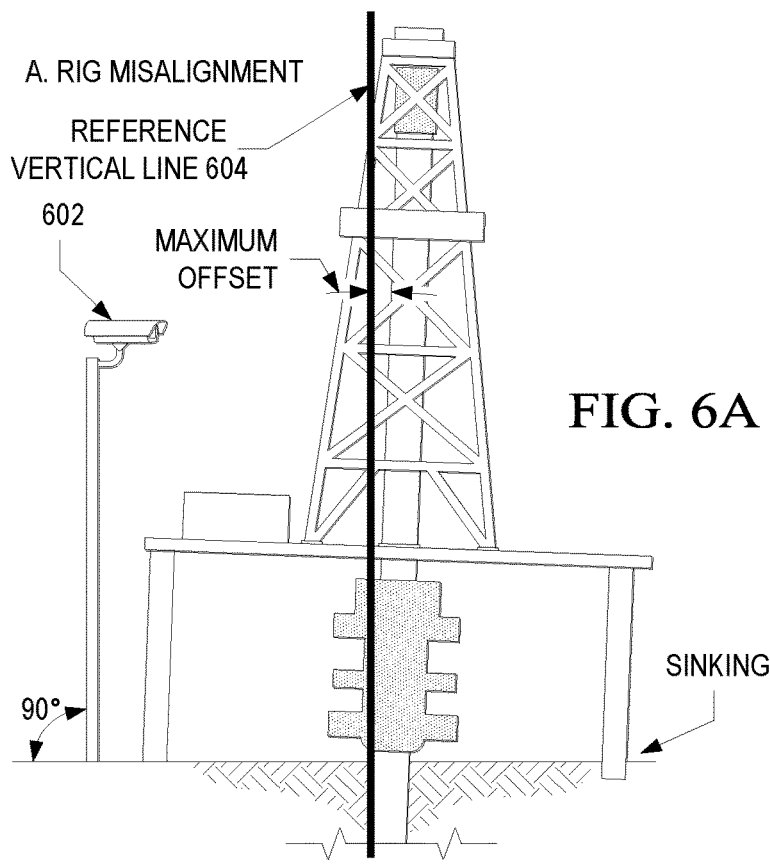
FIGS. 6A, 6B, and 6C illustrate an example process of characterizing rig alignment, according to some implementations of the present disclosure.
Figure 6B:
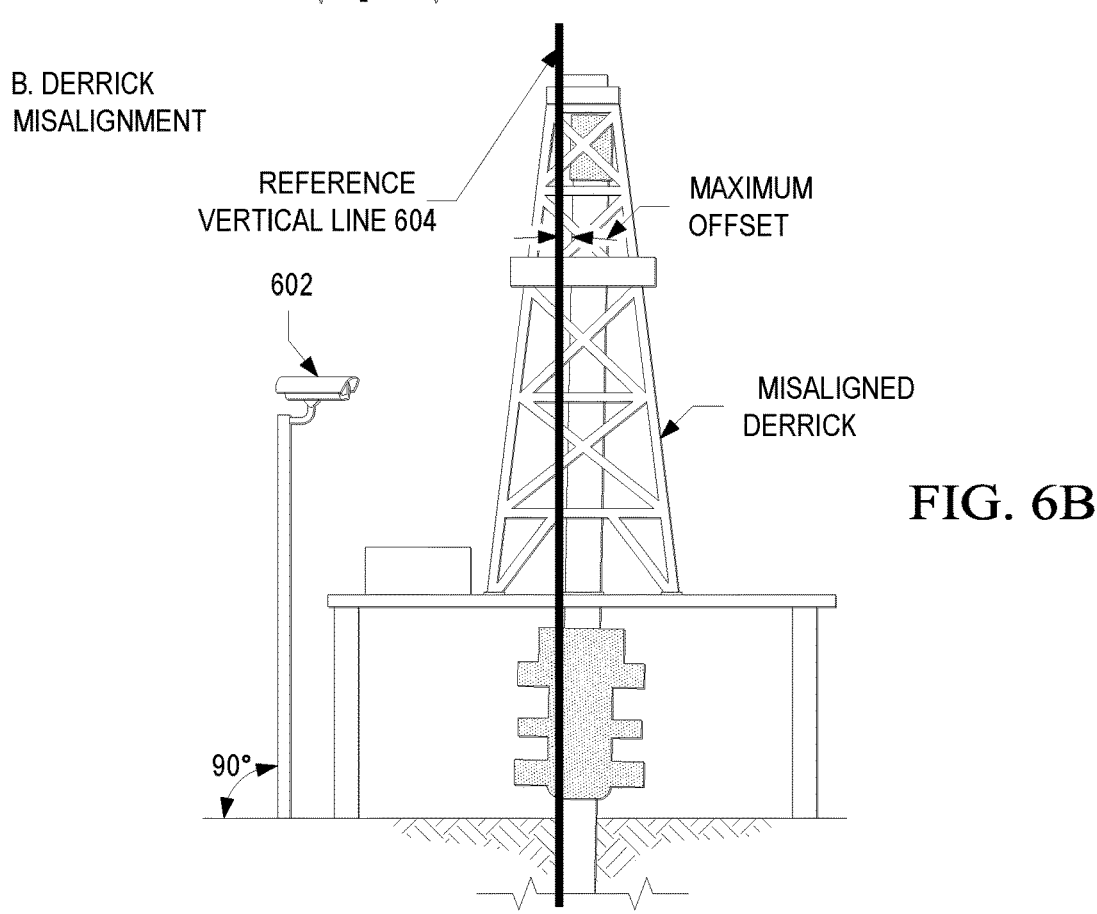
Figure 6C:
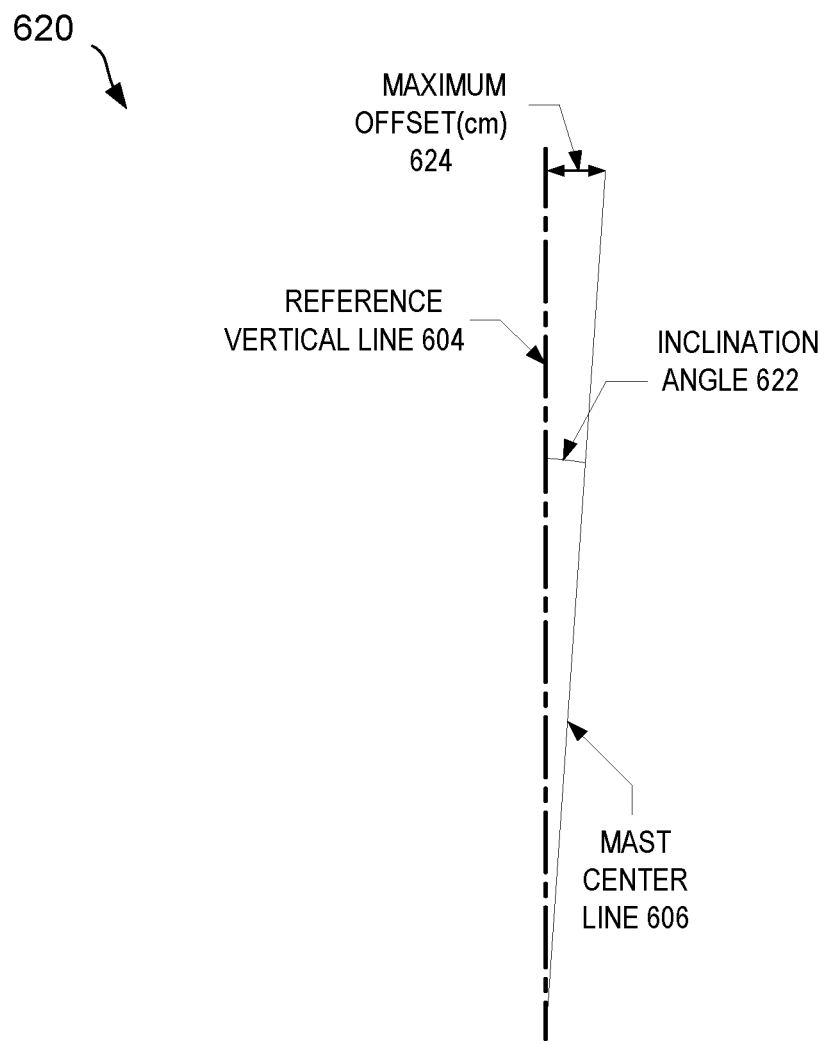

FIGS. 6A, 6B, and 6C illustrate an example process of characterizing rig alignment, according to some implementations. In this example, an image sensor 602 is used to capture an image stream of a drilling rig in order to identify a rig alignment condition of the drilling rig. In particular, the image stream can be used to identify rig misalignments (shown in FIG. 6A) and derrick misalignments (shown in FIG. 6B). Within examples, the monitoring system enables the automatic identification of rig alignment due to movement caused by derrick vibrations and due to sinkholes or weak foundation supporting the rig. These two types of misalignments may result in interruption of operations, excessive friction at the surface casing/rotary table/BOPs, surface equipment damage, safety risks, rig collapse, among others.

In order to identify the misalignments, image and pixelation techniques are used to convert the image stream at time step to into a digital representation 620 shown in FIG. 6C. The digital representation 620 is indicative of a number of offset pixels from a drilling rig mast 606 to a vertical reference line 604. The offset pixels are then converted into distance (for example, centimeter [cm], inch [in], or other measure) by using the distance of the image sensor to the drilling rig mast 606, inclination angle 622, and the number offset pixels (for example, maximum offset 624). In an embodiment, the computed offset distance and inclination angle are displayed on the rig crew computer or sent by any other communication means (message, email, among others). In another embodiment, the computed offset distance and inclination angle are tied to an auto-driller system that makes changes to specific drilling equipment parameters to improve drilling efficiency or safety. As an example, the auto-driller can automatically reduce hookload if the rig tilt exceeds threshold (safe) operational limits.

Figure 7:
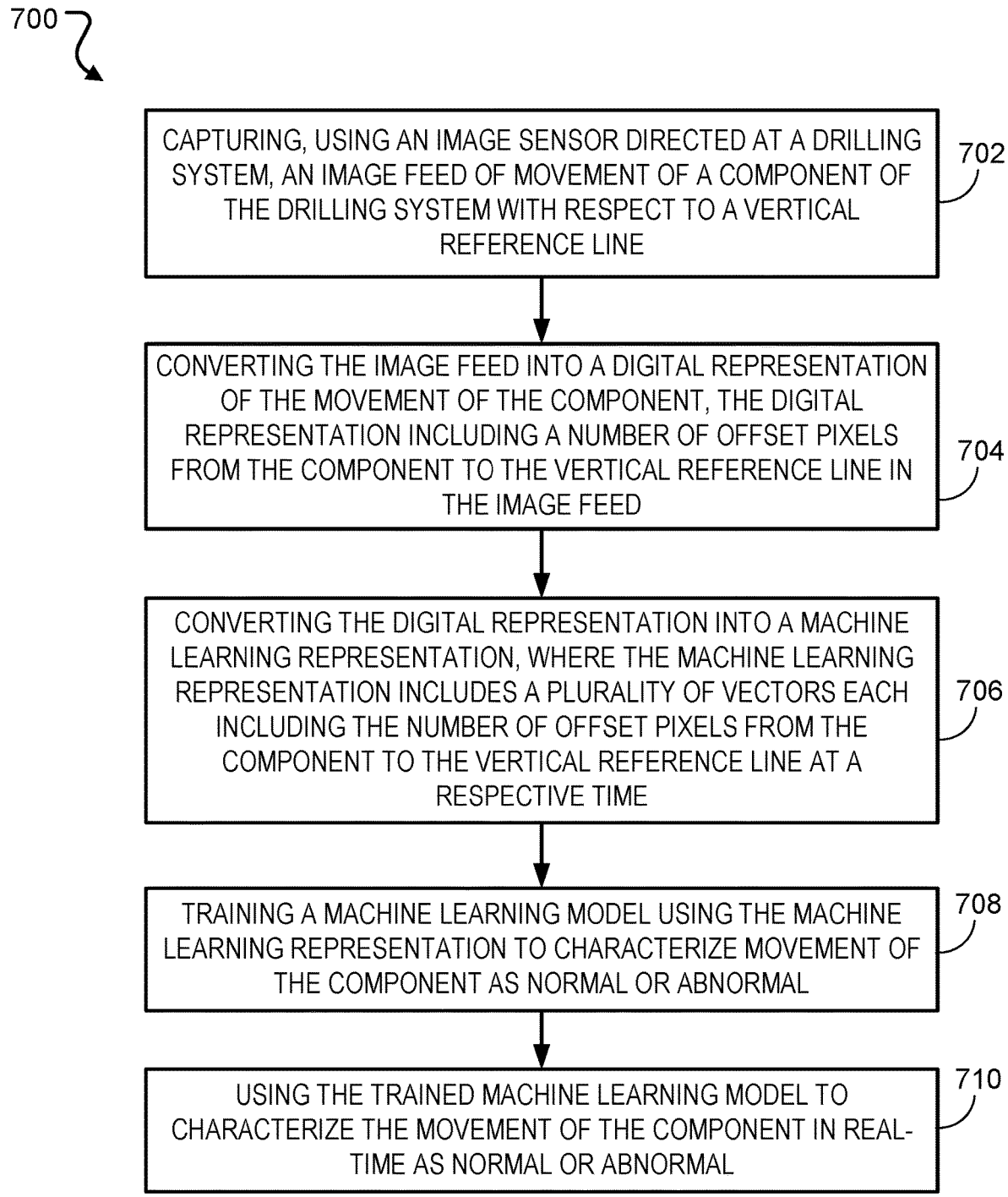
FIG. 7 illustrates a flow chart of an example process, according to some implementations of the present disclosure.

FIG. 7 is a flow chart of an example method 700 for monitoring a rig system (such as the example rig system 800). For clarity of presentation, the description that follows generally describes method 700 in the context of the other figures in this description. However, it will be understood that method 700 can be performed by any suitable system, environment, software, and hardware, or a combination of systems, environments, software, and hardware as appropriate. For example, the monitoring system 100 (or any system including the monitoring system 100) can be used to implement the method 700. In some implementations, various steps of method 700 can be run in parallel, in combination, in loops, or in any order.

At step 702, the method 700 involves capturing, using an image sensor directed at a drilling system, an image feed of movement of a component of the drilling system with respect to a vertical reference line. The image feed can be captured, for example, by the image sensors of the image sensor installation 102 of the monitoring system 100. The image feed can be provided to the edge gateway 106 of the monitoring system 100. The component may be a drilling rig 118, a drill string 120, or any component of a drilling system (for example, drill string tool joints or connections).

At step 704, the method 700 involves converting the image feed into a digital representation of the movement of the component, the digital representation including a number of offset pixels from the component to the vertical reference line in the image feed. In particular, the edge gateway 106 can process and analyze the image feed provided by the image sensor installation 102 to generate a digital representation of the image feed. The digital representation, such as digital representation 310, is indicative of a number of offset pixels from the component to the vertical reference line.

At step 706, the method 700 involves converting the digital representation into a ML representation, the ML representation including a plurality of vectors each including the number of offset pixels from the component to the vertical reference line at a respective time. In particular, the edge gateway 106 can process and analyze the digital representation to generate the ML representation. In an example, the ML representation may include a plurality of vectors each associated with a respective time tn. Each vector represents the number of offset pixels relative to the reference vertical line at time tn. Therefore, the vector containing the offset pixels at tn represents a sample $S_{tn}$, such that $S_{tn} = \{x_1, x_2, \ldots, x_n\}: y_{tn}$ where $x_i$ represent negative/positive pixel offsets at the survey points. In some embodiments, the ML representation further includes labels assigned to each vector in the representation. The label associated with a vector indicates whether the offset pixel values of the vector are indicative of normal or abnormal operations. As described herein, such labeled vectors are used in supervised learning algorithms.

At step 708, the method 700 involves training a ML model using the ML representation to characterize the movement of the component as normal or abnormal. In some embodiments, the ML representation, such as representation 314 of FIG. 3C and representation 400 of FIG. 4, are used as input for training supervised learning models. In some embodiments, the vectors of the ML representation are labeled. In other embodiments, unsupervised learning algorithms, such as, clustering, principal component analysis, among others, may be used for anomaly/outlier detection. In such embodiments, the unsupervised models would discriminate the vectors with normal operations from those with any kind of dysfunction or aberrant drill string behavior.

At step 710, the method 700 involves using the trained ML model to characterize the movement of the component in real-time as normal or abnormal. The image feed may be the same image feed that is used to train the ML model or a different image feed that is capturing movement of another drilling system in real-time.

In some implementations, the image sensor includes a network of image sensors arranged about the drilling rig at respective angles, and the image feed includes a plurality of image feeds capturing the movement of the component from a plurality of angles.

In some implementations, each vector of the ML representation includes an indication of offset pixels from the component to the vertical reference line in the plurality of image feeds at the respective time.

In some implementations, the component is a drill string, and capturing, using the image sensor, the image feed of the movement of the component includes capturing the movement of the drill string with respect to the vertical reference line at a plurality of predetermined survey points along the vertical reference line.

In some implementations, characterizing the movement of the component in real-time as abnormal includes characterizing the movement as stick-slip, axial vibration, tangential vibration, or lateral vibration.

In some implementations, the component is a drilling rig, and characterizing the movement of the component in real-time as abnormal includes characterizing the movement as a rig misalignment or a derrick misalignment.

In some implementations, the method 700 further includes training the ML model using the image feed to characterize drilling operations, lithology changes, and kick off points in real-time.

In some implementations, the ML representation is further based on drilling surface parameters of the drilling rig.

In some implementations, the method 700 further includes in response to characterizing movement of the component in real-time as abnormal, performing a remedial action.

In some implementations, the remedial action includes displaying a representation of the abnormal movement on the control panel.

In some implementations, the remedial action includes triggering an alarm.

In some implementations, the remedial action includes controlling the drilling system to adjust a drilling parameter, perhaps while drilling a wellbore.

In some implementations, the method 700 further includes in response to characterizing movement of the component in real-time as abnormal, transmitting a signal to drive a controllable device. In some implementations, the controllable device is in a remote location (for example, in a location that is not local to the rig). For example, the controllable device is in a control room. In some implementations, the controllable device includes a control panel in a control room, and the signal can drive the control panel to display a representation of the abnormal movement. In some implementations, the controllable device includes an alarm (remote or local), and the signal can trigger the alarm (audio or visual). In some implementations, the controllable device includes a running tool that is running the drill string into or out of the well, and the signal causes the drill string to adjust a rate at which the running tool is running the drill string into or out of the well.

Figure 8:
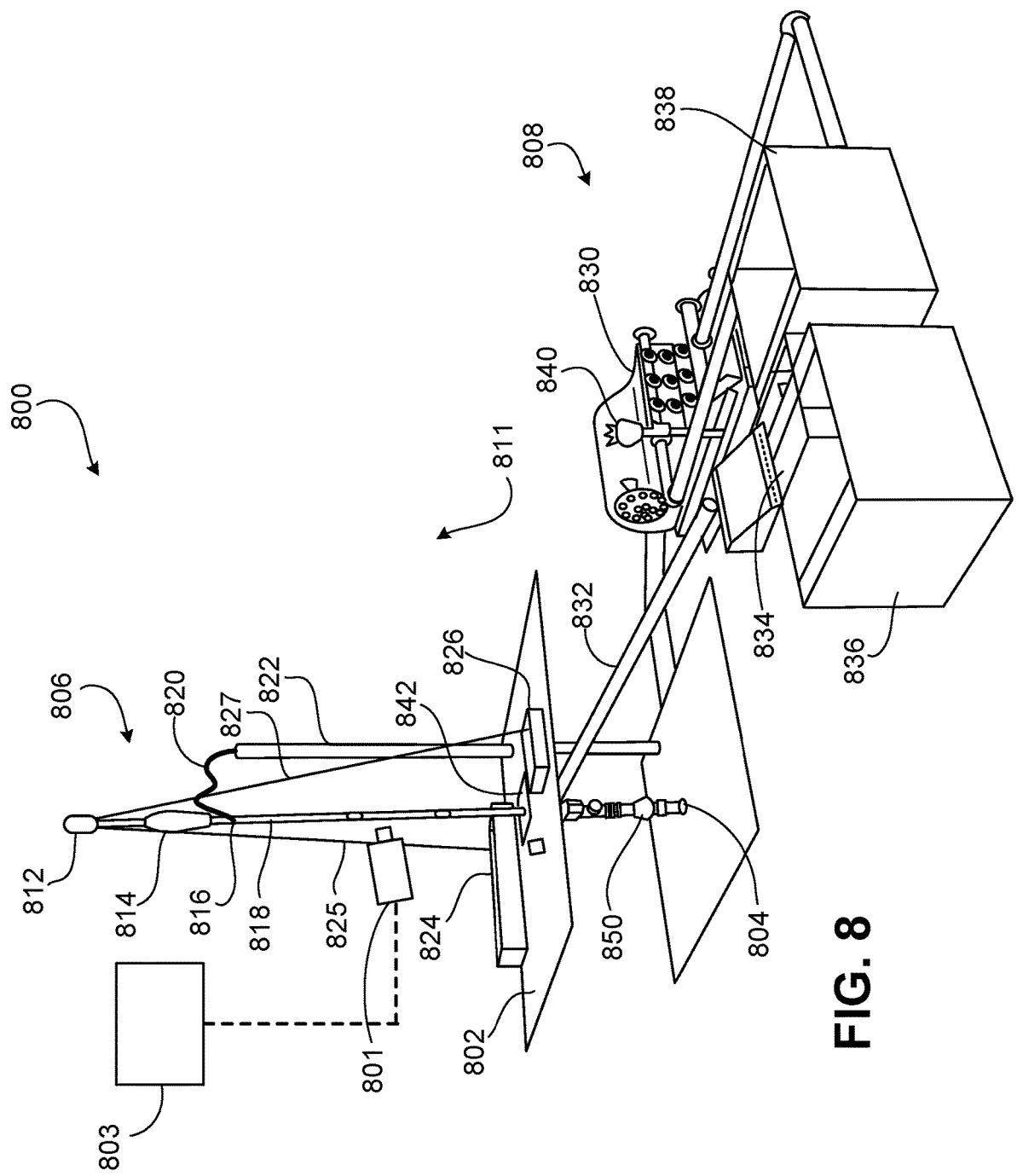
FIG. 8 illustrates a schematic view of a rig system, according to some implementations of the present disclosure.

FIG. 8 is a partial schematic perspective view of an example rig system 800 for drilling and producing a well, according to some implementations. The well can extend from the surface through the Earth to one or more subterranean zones of interest. The example rig system 800 includes a drill floor 802 positioned above the surface, a wellhead 804, a drill string assembly 806 supported by the rig structure, a fluid circulation system 808 to filter used drilling fluid from the wellbore and provide clean drilling fluid to the drill string assembly 806, and a monitoring system 811 (including an image sensor 801 and an edge gateway 803) to monitor in real-time one or more components on the rig system 800. For example, the example rig system 800 of FIG. 8 is shown as a drill rig capable of performing a drilling operation with the rig system 800 supporting the drill string assembly 806 over a wellbore. The wellhead 804 can be used to support casing or other well components or equipment into the wellbore of the well.

The derrick or mast is a support framework mounted on the drill floor 802 and positioned over the wellbore to support the components of the drill string assembly 806 during drilling operations. A crown block 812 forms a longitudinally-fixed top of the derrick, and connects to a travelling block 814 with a drilling line including a set of wire ropes or cables. The crown block 812 and the travelling block 814 support the drill string assembly 806 via a swivel 816, a kelly 818, or a top drive system (not shown). Longitudinal movement of the travelling block 814 relative to the crown block 812 of the drill string assembly 806 acts to move the drill string assembly 806 longitudinally upward and downward. The swivel 816, connected to and hung by the travelling block 814 and a rotary hook, allows free rotation of the drill string assembly 806 and provides a connection to a kelly hose 820, which is a hose that flows drilling fluid from a drilling fluid supply of the circulation system 808 to the drill string assembly 806. A standpipe 822 mounted on the drill floor 802 guides at least a portion of the kelly hose 820 to a location proximate to the drill string assembly 806. The kelly 818 is a hexagonal device suspended from the swivel 816 and connected to a longitudinal top of the drill string assembly 806, and the kelly 818 turns with the drill string assembly 806 as the rotary table 842 of the drill string assembly turns.

In the example rig system 800 of FIG. 8, the drill string assembly 806 is made up of drill pipes with a drill bit (not shown) at a longitudinally bottom end of the drill string. The drill pipe can include hollow steel piping, and the drill bit can include cutting tools, such as blades, dics, rollers, cutters, or a combination of these, to cut into the formation and form the wellbore. The drill bit rotates and penetrates through rock formations below the surface under the combined effect of axial load and rotation of the drill string assembly 806. In some implementations, the kelly 818 and swivel 816 can be replaced by a top drive that allows the drill string assembly 806 to spin and drill. The wellhead assembly 804 can also include a drawworks 824 and a deadline anchor 826, where the drawworks 824 includes a winch that acts as a hoisting system to reel the drilling line in and out to raise and lower the drill string assembly 806 by a fast line 825.

The deadline anchor 826 fixes the drilling line opposite the drawworks 824 by a deadline 827, and can measure the suspended load (or hook load) on the rotary hook. The weight on bit (WOB) can be measured when the drill bit is at the bottom of the wellbore. The wellhead assembly 804 also includes a blowout preventer 850 positioned at the surface of the well and below (but often connected to) the drill floor 802. The blowout preventer 850 acts to prevent well blowouts caused by formation fluid entering the wellbore, displacing drilling fluid, and flowing to the surface at a pressure greater than atmospheric pressure. The blowout preventer 850 can close around (and in some instances, through) the drill string assembly 806 and seal off the space between the drill string and the wellbore wall. The blowout preventer 850 is described in more detail later.

During a drilling operation of the well, the circulation system 808 circulates drilling fluid from the wellbore to the drill string assembly 806, filters used drilling fluid from the wellbore, and provides clean drilling fluid to the drill string assembly 806. The example circulation system 808 includes a fluid pump 830 that fluidly connects to and provides drilling fluid to drill string assembly 806 via the kelly hose 820 and the standpipe 822. The circulation system 808 also includes a flow-out line 832, a shale shaker 834, a settling pit 836, and a suction pit 838. In a drilling operation, the circulation system 808 pumps drilling fluid from the surface, through the drill string assembly 806, out the drill bit and back up the annulus of the wellbore, where the annulus is the space between the drill pipe and the formation or casing. The density of the drilling fluid is intended to be greater than the formation pressures to prevent formation fluids from entering the annulus and flowing to the surface and less than the mechanical strength of the formation, as a greater density may fracture the formation, thereby creating a path for the drilling fluids to go into the formation. Apart from well control, drilling fluids can also cool the drill bit and lift rock cuttings from the drilled formation up the annulus and to the surface to be filtered out and treated before it is pumped down the drill string assembly 806 again. The drilling fluid returns in the annulus with rock cuttings and flows out to the flow-out line 832, which connects to and provides the fluid to the shale shaker 834. The flow-out line 832 is an inclined pipe that directs the drilling fluid from the annulus to the shale shaker 834. The shale shaker 834 includes a mesh-like surface to separate the coarse rock cuttings from the drilling fluid, and finer rock cuttings and drilling fluid then go through the settling pit 836 to the suction pit 838. The circulation system 808 includes a mud hopper 840 into which materials (for example, to provide dispersion, rapid hydration, and uniform mixing) can be introduced to the circulation system 808. The fluid pump 830 cycles the drilling fluid up the standpipe 822 through the swivel 816 and back into the drill string assembly 806 to go back into the well.

The example wellhead assembly 804 can take a variety of forms and include a number of different components. For example, the wellhead assembly 804 can include additional or different components than the example shown in FIG. 8. Similarly, the circulation system 808 can include additional or different components than the example shown in FIG. 8.

Figure 9:
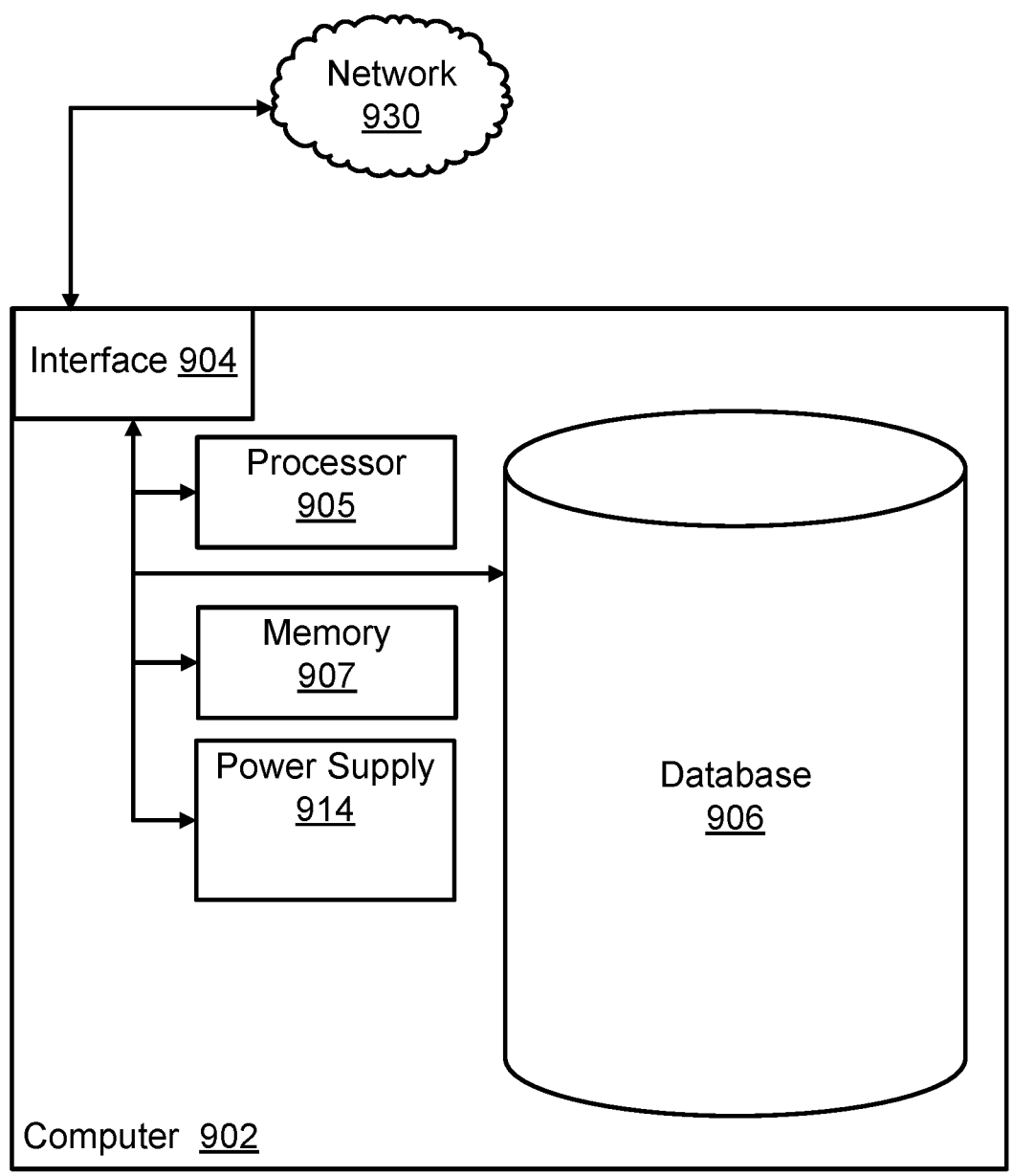
FIG. 9 illustrates a block diagram of an example computing system, according to some implementations of the present disclosure.

FIG. 9 is a block diagram of an example computer system 900 that can be used to provide computational functionalities associated with described algorithms, methods, functions, processes, flows, and procedures described in the present disclosure, according to some implementations of the present disclosure. In some implementations, the edge gateway 106 can be the computer system 900 or include the computer system 900. In some implementations, the edge gateway 106 can communicate with the computer system 900.

The illustrated computer 902 is intended to encompass any computing device such as a server, a desktop computer, an embedded computer, a laptop/notebook computer, a wireless data port, a smart phone, a personal data assistant (PDA), a tablet computing device, or one or more processors within these devices, including physical instances, virtual instances, or both. The computer 902 can include input devices such as keypads, keyboards, and touch screens that can accept user information. Also, the computer 902 can include output devices that can convey information associated with the operation of the computer 902. The information can include digital data, visual data, audio information, or a combination of information. The information can be presented in a graphical user interface (UI) (or GUI). In some implementations, the inputs and outputs include display ports (such as DVI-I+2× display ports), USB 3.0, GbE ports, isolated DI/O, SATA-III (6.0 Gb/s) ports, mPCIe slots, a combination of these, or other ports. In instances of an edge gateway, the computer 902 can include a Smart Embedded Management Agent (SEMA), such as a built-in ADLINK SEMA 2.2, and a video sync technology, such as Quick Sync Video technology supported by ADLINK MSDK+. In some examples, the computer 902 can include the MXE-5400 Series processor-based fanless embedded computer by ADLINK, though the computer 902 can take other forms or include other components.

The computer 902 can serve in a role as a client, a network component, a server, a database, a persistency, or components of a computer system for performing the subject matter described in the present disclosure. The illustrated computer 902 is communicably coupled with a network 930. In some implementations, one or more components of the computer 902 can be configured to operate within different environments, including cloud-computing-based environments, local environments, global environments, and combinations of environments.

At a high level, the computer 902 is an electronic computing device operable to receive, transmit, process, store, and manage data and information associated with the described subject matter. According to some implementations, the computer 902 can also include, or be communicably coupled with, an application server, an email server, a web server, a caching server, a streaming data server, or a combination of servers.

The computer 902 can receive requests over network 930 from a client application (for example, executing on another computer 902). The computer 902 can respond to the received requests by processing the received requests using software applications. Requests can also be sent to the computer 902 from internal users (for example, from a command console), external (or third) parties, automated applications, entities, individuals, systems, and computers.

Each of the components of the computer 902 can communicate using a system bus. In some implementations, any or all of the components of the computer 902, including hardware or software components, can interface with each other or the interface 904 (or a combination of both), over the system bus. Interfaces can use an application programming interface (API), a service layer, or a combination of the API and service layer. The API can include specifications for routines, data structures, and object classes. The API can be either computer-language independent or dependent. The API can refer to a complete interface, a single function, or a set of APIs.

The service layer can provide software services to the computer 902 and other components (whether illustrated or not) that are communicably coupled to the computer 902. The functionality of the computer 902 can be accessible for all service consumers using this service layer. Software services, such as those provided by the service layer, can provide reusable, defined functionalities through a defined interface. For example, the interface can be software written in JAVA, C++, Python, or a language providing data in extensible markup language (XML) format. While illustrated as an integrated component of the computer 902, in alternative implementations, the API or the service layer can be stand-alone components in relation to other components of the computer 902 and other components communicably coupled to the computer 902. Moreover, any or all parts of the API or the service layer can be implemented as child or sub-modules of another software module, enterprise application, or hardware module without departing from the scope of the present disclosure.

The computer 902 can include an interface 904. Although illustrated as a single interface 904 in FIG. 9, two or more interfaces 904 can be used according to particular needs, desires, or particular implementations of the computer 902 and the described functionality. The interface 904 can be used by the computer 902 for communicating with other systems that are connected to the network 930 (whether illustrated or not) in a distributed environment. Generally, the interface 904 can include, or be implemented using, logic encoded in software or hardware (or a combination of software and hardware) operable to communicate with the network 930. More specifically, the interface 904 can include software supporting one or more communication protocols associated with communications. As such, the network 930 or the interface's hardware can be operable to communicate physical signals within and outside of the illustrated computer 902.

The computer 902 includes a processor 905. Although illustrated as a single processor 905 in FIG. 9, two or more processors 905 can be used according to particular needs, desires, or particular implementations of the computer 902 and the described functionality. Generally, the processor 905 can execute instructions and can manipulate data to perform the operations of the computer 902, including operations using algorithms, methods, functions, processes, flows, and procedures as described in the present disclosure.

The computer 902 can also include a database 906 that can hold data for the computer 902 and other components connected to the network 930 (whether illustrated or not). For example, database 906 can be an in-memory, conventional, or a database storing data consistent with the present disclosure. In some implementations, database 906 can be a combination of two or more different database types (for example, hybrid in-memory and conventional databases) according to particular needs, desires, or particular implementations of the computer 902 and the described functionality. Although illustrated as a single database 906 in FIG. 9, two or more databases (of the same, different, or combination of types) can be used according to particular needs, desires, or particular implementations of the computer 902 and the described functionality. While database 906 is illustrated as an internal component of the computer 902, in alternative implementations, database 906 can be external to the computer 902.

The computer 902 also includes a memory 907 that can hold data for the computer 902 or a combination of components connected to the network 930 (whether illustrated or not). Memory 907 can store any data consistent with the present disclosure. In some implementations, memory 907 can be a combination of two or more different types of memory (for example, a combination of semiconductor and magnetic storage) according to particular needs, desires, or particular implementations of the computer 902 and the described functionality. Although illustrated as a single memory 907 in FIG. 9, two or more memories 907 (of the same, different, or combination of types) can be used according to particular needs, desires, or particular implementations of the computer 902 and the described functionality. While memory 907 is illustrated as an internal component of the computer 902, in alternative implementations, memory 907 can be external to the computer 902.

An application can be an algorithmic software engine providing functionality according to particular needs, desires, or particular implementations of the computer 902 and the described functionality. For example, an application can serve as one or more components, modules, or applications. Multiple applications can be implemented on the computer 902. Each application can be internal or external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion and management circuits, including recharging, standby, and power management functionalities. In some implementations, the power-supply 914 can include a power plug to allow the computer 902 to be plugged into a wall socket or a power source to, for example, power the computer 902 or recharge a rechargeable battery.

There can be any number of computers 902 associated with, or external to, a computer system including computer 902, with each computer 902 communicating over network 930. Further, the terms "client," "user," and other appropriate terminology can be used interchangeably, as appropriate, without departing from the scope of the present disclosure. Moreover, the present disclosure contemplates that many users can use one computer 902 and one user can use multiple computers 902.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), one or more graphic processing units (GPUs), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, Linux, Unix, Windows, Mac OS, Android, or iOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, GPUs, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, or in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method comprising:
  capturing, using an image sensor directed at a drilling system, an image feed of movement of a component of the drilling system with respect to a vertical reference line;
  converting the image feed into a digital representation of the movement of the component, the digital representation comprising a number of offset pixels from the component to the vertical reference line in the image feed;
  converting the digital representation into a machine learning (ML) representation, the ML representation including a plurality of vectors each comprising the number of offset pixels from the component to the vertical reference line at a respective time, wherein the number of offset pixels represents a distance of misalignment from the component and the vertical reference line;
  training a ML model using the ML representation to characterize the movement of the component as normal or abnormal; and
  using the trained ML model to characterize the movement of the component in real-time as normal or abnormal,
  wherein the image sensor comprises a network of image sensors arranged about the drilling system at respective angles, and wherein the image feed comprises a plurality of image feeds capturing the movement of the component from a plurality of angles.

2. The method of claim 1, wherein each vector of the ML representation comprises an indication of offset pixels from the component to the vertical reference line in the plurality of image feeds at the respective time.

3. The method of claim 1, wherein the component is a drill string, and wherein capturing, using the image sensor, the image feed of the movement of the component comprises:
  capturing the movement of the drill string with respect to the vertical reference line at a plurality of predetermined survey points along the vertical reference line.

4. The method of claim 3, wherein characterizing the movement of the component in real-time as abnormal comprises:
 characterizing the movement as stick-slip, axial vibration, tangential vibration, or lateral vibration.

5. The method of claim 1, wherein the component is a drilling rig, and wherein characterizing the movement of the component in real-time as abnormal comprises:
 characterizing the movement as a rig misalignment or a derrick misalignment.

6. The method of claim 1, further comprising:
 training the ML model using the image feed to characterize drilling operations, lithology changes, and kick off points in real-time.

7. The method of claim 1, wherein the ML representation is further based on drilling surface parameters of the drilling system.

8. The method of claim 1, further comprising:
 in response to characterizing movement of the component in real-time as abnormal, performing a remedial action.

9. The method of claim 8, wherein the remedial action comprises displaying a representation of the abnormal movement on a display device.

10. The method of claim 8, wherein the remedial action comprises triggering an alarm.

11. The method of claim 8, wherein the remedial action comprises controlling the drilling system to adjust a drilling parameter.

12. A non-transitory computer-readable medium storing one or more instructions executable by a computer system to perform operations comprising:
 capturing, using an image sensor directed at a drilling system, an image feed of movement of a component of the drilling system with respect to a vertical reference line;
 converting the image feed into a digital representation of the movement of the component, the digital representation comprising a number of offset pixels from the component to the vertical reference line in the image feed;
 converting the digital representation into a machine learning (ML) representation, the ML representation including a plurality of vectors each comprising the number of offset pixels from the component to the vertical reference line at a respective time, wherein the number of offset pixels represents a distance of misalignment from the component and the vertical reference line;
 training a ML model using the ML representation to characterize the movement of the component as normal or abnormal; and
 using the trained ML model to characterize the movement of the component in real-time as normal or abnormal,
 wherein the image sensor comprises a network of image sensors arranged about the drilling system at respective angles, and wherein the image feed comprises a plurality of image feeds capturing the movement of the component from a plurality of angles.

13. The non-transitory computer-readable medium of claim 12, wherein each vector of the ML representation comprises an indication of offset pixels from the component to the vertical reference line in the plurality of image feeds at the respective time.

14. The non-transitory computer-readable medium of claim 12, wherein the component is a drill string, and wherein capturing, using the image sensor, the image feed of the movement of the component comprises:
 capturing the movement of the drill string with respect to the vertical reference line at a plurality of predetermined survey points along the vertical reference line.

15. The non-transitory computer-readable medium of claim 14, wherein characterizing the movement of the component in real-time as abnormal comprises:
 characterizing the movement as stick-slip, axial vibration, tangential vibration, or lateral vibration.

16. The non-transitory computer-readable medium of claim 12, wherein the component is a drilling rig, and wherein characterizing the movement of the component in real-time as abnormal comprises:
 characterizing the movement as a rig misalignment or a derrick misalignment.

17. A system, comprising:
 one or more processors; and
 a non-transitory computer-readable storage medium coupled to the one or more processors and storing programming instructions for execution by the one or more processors, the programming instructions instructing the one or more processors to perform operations comprising:
 capturing, using an image sensor directed at a drilling system, an image feed of movement of a component of the drilling system with respect to a vertical reference line;
 converting the image feed into a digital representation of the movement of the component, the digital representation comprising a number of offset pixels from the component to the vertical reference line in the image feed;
 converting the digital representation into a machine learning (ML) representation, the ML representation including a plurality of vectors each comprising the number of offset pixels from the component to the vertical reference line at a respective time, wherein the number of offset pixels represents a distance of misalignment from the component and the vertical reference line;
 training a ML model using the ML representation to characterize the movement of the component as normal or abnormal; and
 using the trained ML model to characterize the movement of the component in real-time as normal or abnormal,
 wherein the image sensor comprises a network of image sensors arranged about the drilling system at respective angles, and wherein the image feed comprises a plurality of image feeds capturing the movement of the component from a plurality of angles.

\* \* \* \* \*